United States Patent [19]
Clausen et al.

[11] Patent Number: 6,143,545
[45] Date of Patent: Nov. 7, 2000

[54] METHOD FOR REDUCING PHOSPHORUS CONTENT OF EDIBLE OILS

[75] Inventors: Ib Groth Clausen, Hillerød; Shamkant Anant Patkar, Lyngby; Kim Borch, Copenhagen, all of Denmark; Martin Barfoed, Raleigh, N.C.; Kim Clausen, Tølløse, Denmark; Claus Crone Fuglsang, Niva, Denmark; Lone Dybdal, Copenhagen, Denmark; Torben Halkier, Birkerød, Denmark

[73] Assignee: Novo Nordisk A/S, Bagsærd, Denmark

[21] Appl. No.: 09/387,922

[22] Filed: Sep. 1, 1999

Related U.S. Application Data

[62] Division of application No. 08/988,111, Dec. 9, 1997.
[60] Provisional application No. 60/039,791, Mar. 4, 1997.

[30] Foreign Application Priority Data

| Dec. 9, 1996 | [DK] | Denmark | 1408/96 |
| Dec. 16, 1996 | [DK] | Denmark | 1432/96 |
| Feb. 21, 1997 | [DK] | Denmark | 0190/97 |
| Feb. 26, 1997 | [DK] | Denmark | 0211/97 |
| Nov. 11, 1997 | [DK] | Denmark | 1283/97 |

[51] Int. Cl.⁷ .............. C12N 9/20; C12N 1/20; C12N 15/00; C07H 21/02
[52] U.S. Cl. ............ 435/198; 435/252.3; 435/320.1; 435/134; 536/23.2; 536/23.7; 530/350
[58] Field of Search ............... 435/198, 252.3, 435/320.1, 134; 536/23.2, 23.7; 530/350

[56] References Cited

U.S. PATENT DOCUMENTS

| 4,567,046 | 1/1986 | Inoue et al. | 426/20 |
| 5,264,367 | 11/1993 | Aaltust et al. | 437/271 |

FOREIGN PATENT DOCUMENTS

| 0 219 269 | 4/1987 | European Pat. Off. . |
| 0 130 064 | 8/1988 | European Pat. Off. . |
| 0 575 133 | 12/1993 | European Pat. Off. . |
| 0 622 446 | 11/1994 | European Pat. Off. . |
| 0 654 527 | 5/1995 | European Pat. Off. . |
| WO 96/13579 | 5/1996 | WIPO . |
| WO 96/18729 | 6/1996 | WIPO . |
| WO 97/05219 | 2/1997 | WIPO . |

OTHER PUBLICATIONS

Derwent accession No. 90–226962.
Derwent accession No. 90–096521.
EMBL, Databas GenBank/DDBJ accession No. S77816.
Buchold et al., Fat. Sci. Technol., vol. 95, Jahrgang Nr. 8, (1993).
Kawasaki et al., J. Biochem., vol. 77, No. 6, pp. 1233–1244 (1975).
Mustranta et al., Process Biochem., vol. 30, No. 5, pp. 393–401 (1995).
Ichimasa et al., Agric. Biol. Chem., 49(4):1083–1089 (1985).
Nagao et al., J. Biochem. 116:536–540 (1994).
Masuda et al., Eur. J. Biochem. 202:783–787, (1991).
Tsung–Che et al., Phytopathological Notes, 58:1437–1438 (1968).
Lee et al., The Journal of Biol. Chem., 269(31):9725–19730 (1994).
Kuwabara et al., Agric. Biol. Chem., 52(10):2451–2458 (1988).
Watanabe et al., FEMS Microbiology Letters 124:29–34 (1994).
Oishi et al., Biosci Biotech. Biochem., 60(7):1087–1092 (1996).
Uehara et al., Agric. Biol. Chem., vol. 43, No. 3, pp. 517–525 (1979).

*Primary Examiner*—Rebecca E. Prouty
*Assistant Examiner*—Tekchand Saidha
*Attorney, Agent, or Firm*—Steve T. Zelson, Esq.; Reza Green, Esq.

[57] ABSTRACT

The present invention relates to a method for reducing the content of phosphorous containing components in an edible oil comprising a high amount of non-hydratable phosphorus content, wherein said method comprises use of a phospholipase. Further the present invention relates to an enzyme with phospholipase activity, a cloned DNA sequence encoding the enzyme with phospholipase activity, a method of producing the enzyme, and the use of said enzyme for a number of industrial applications.

10 Claims, 2 Drawing Sheets

FIG. 1

METHOD FOR REDUCING PHOSPHORUS CONTENT OF EDIBLE OILS

This application is a divisional of application Ser. No. 08/988,111, filed Dec. 9, 1997, which claims priority under 35 U.S.C. 119 of Danish applications 1408/96 filed Dec. 9, 1996, 1432/96 filed Dec. 16, 1996, 0190/97 filed Feb. 21, 1997, 0211/97 filed Feb. 26, 1997, and 1283/97 filed Nov. 11, 1997, and U.S. provisional patent application Ser. No. 60/039,791 filed Mar. 4, 1997, the contents of which applications are fully incorporated herein by reference.

FIELD OF INVENTION

The present invention relates to a method for reducing the content of phosphorous containing components in an edible oil comprising a high amount of non-hydratable phosphorus, by the use of a phospholipase.

Further, the present invention relates to an enzyme with phospholipase activity, a cloned DNA sequence encoding the enzyme with phospholipase activity, a method of producing the enzyme, and the use of said enzyme for a number of industrial applications.

BACKGROUND OF THE INVENTION

Enzymatic degumming of edible oils comprising a relatively high amount of non-hydratable phosphorus content:

It is known to use phospholipase for enzymatic degumming of a water degummed edible oil (U.S. Pat. No. 5,264,367, Metallgesellschaft, Röhm), to reduce the phosphorous content of said water degummed edible oil.

However, this process may still be improved, especially to perform enzymatic degumming of edible oils comprising a high amount of non-hydratable phosphorus (NHP) and/or relatively high amounts of mucilage.

Consequently, an object of the invention is to provide a method for reducing the content of phosphorus containing components of such oils, wherein said method comprises use of a phospholipase.

A Phospholipase of the invention

Phospholipids, such as lecithin or phosphatidylcholine, consist of glycerol esterified with two fatty acids in an outer (sn-1) and the middle (sn-2) positions and esterified with phosphoric acid in the third position; the phosphoric acid, in turn, may be esterified to an amino-alcohol. Phospholipases are enzymes which participate in the hydrolysis of phospholipids. Several types of phospholipase activity can be distinguished, including phospholipases $A_1$ ($PLA_1$) and $A_2$ ($PLA_2$) which hydrolyze one fatty acyl group (in the sn-1 and sn-2 position, respectively) to form lysophospholipid; and lysophospholipase (or phospholipase B (PLB)) which can hydrolyze the remaining fatty acyl group in lysophospholipid.

This invention relates i.a. to a filamentous fungal phospholipase that has the ability to hydrolyze one and/or both fatty acyl groups in a phospholipid (i.e. exhibiting PLA and/or PLB activity).

Previously characterized fungal PLA and/or PLB enzymes:

Numerous references describe characterization of fungal phospholipases. In order to make it easier to get an overview of the prior art status, the references have been grouped in two sections.

Section one deals with references describing the identification of fungal phospholipases presently not believed to be related to the fungal phospholipase of the present invention. These references are mainly included in order to summarize the state of the art within the field of characterization of fungal phospholipases.

Section two deals with references describing characterization of fungal phospholipases believed to be of some relevance to the fungal phospholipases of the present invention.

Section one

Enzymes with phospholipase A and/or B activity have been found in various fungal sources, including *Penicillium notatum* (also known as *P. chrysogenum;* N. Kawasaki, J. Biochem., 77, 1233–44, 1975; N. Masuda et al., Eur. J. Biochem., 202, 783–787, 1991), *P. cyclopium* (Process Biochemistry 30(5): 393–401 (1995)), *Saccharomyces cerevisiae* (M. Ichimasa et al., Agric. Biol. Chem., 49 (4), 1083–89, 1985; F. Paultauf et al., J. Biol. Chem., 269, 19725–30, 1994), *Torulaspora delbrueckii* (old name *Saccharomyces rosei;* Y. Kuwabara, Agric. Biol. Chem., 52 (10), 2451–58, 1988; FEMS, Microbiol. Letters, 124, 29–34), *Schizosaccharomyces pombe* (H. Oishi et al., Biosci. Biotech. Biochem., 60 (7), 1087–92, 1996), *Aspergillus niger* (Technical Bulletin, G-zyme™ G999, Enzyme Bio-Systems Ltd.; Process Biochemistry 30(5): 393–401 (1995)) and *Corticium centrifugum* (S. Uehara et al., Agric. Biol. Chem., 43 (3), 517–525, 1979).

Section two:

EP 575133 A2 describes isolation and characterization of a fungal phoshoslipase A1 obtained from Aspergillus and the use thereof for industrial applications.

No sequence information (neither DNA nor amino acid) is disclosed in the application nor is any strategy or suggestion for cloning any of the Aspergillus phospholipase discussed or indicated in the application.

Tsung-Che et al. (Phytopathological notes 58:1437–38 (1968)) briefly describes characterization of a phospholipase from *Fusarium solani*.

EP 130,064 describes an isolated fraction of a fermentation broth exhibiting lipase activity obtained from the strain *Fusarium oxysporum,* DSM 2672. Furthermore, the use thereof in detergent compositions is disclosed. However, EP 130,064 does not describe this fraction as exhibiting any phospholipase activity.

WO 96/13579 describes a lipase obtained from the strain *Fusarium culmorum,* CBS 513.94 including its N-terminal sequence.

However, WO 96/13579 does not describe any enzyme exhibiting phospholipase activity.

A cDNA sequence encoding a lipase from *Fusarium heterosporum* is described (Cloning and nucleotide sequence of cDNA encoding a lipase from *Fusarium heterosporum,* J. Biochem. 116, 536–540, 1994.). This sequence is presently believed to be the most related DNA sequence compared to a cloned DNA sequence of the invention (See section "Comparison with prior art" (vide infra). However, this reference does not describe any enzyme exhibiting phospholipase activity.

A cDNA sequence encoding a phospholipase B from *Penicillum notatum* is described (Eur. J. Biochem 202:783–787, 1991). However this cloned DNA sequence has very limited homology to a DNA sequence of the invention (See section "Comparison with prior art" (vide infra)

Industrial application of phospholipases:

A number of uses of phospholipases are known in the art, such as to use phospholipase in, e.g. enzymatic degumming of a water degummed oil (U.S. Pat. No. 5,264,367, Metallgesellschaft, Röhm); treatment of starch hydrolysate (particularly from wheat starch) to improve the filterability (EP 219,269, CPC International); as an additive to bread dough to improve the elasticity of the bread (U.S. Pat. No.

4,567,046, Kyowa Hakko); and for preparation of lysolecithin with special emulsifying properties.

Presently, the phospholipase Lecitase® (Novo Nordisk A/S) is used commercially such as for degumming of oils. Lecitase® is a mammalian enzyme obtained from porcine pancreas.

It is well known that it is possible to produce fungal enzymes recombinantly at industrially economically acceptable yields, especially from filamentous fungi.

Consequently, it is an object of this invention to provide an improved phospholipase e.g. for use in the processes described above.

Further, it is an object of the present invention to describe processes and methods for recombinant production at industrially acceptable yields of a phospholipase obtained from a filamentous fungus.

SUMMARY OF THE INVENTION

Water degumming of edible oils is carried out by extraction with water. In that treatment, a part of the phosphatides is left in the oil. That part is described by the generic term "non-hydratable phosphatides" (NHP). In the production of oils, it is essential to remove the NHP content (U.S. Pat. No. 5,264,367).

The present invention provides a method to remove the NHP content in an oil comprising a relatively high amount of NHP.

Accordingly, in a first aspect the invention relates to a method for reducing the content of phosphorus containing components in an edible oil having a non-hydratable phosphorus content of at least 50 ppm measured by, i) pre-treating the edible oil, at 60° C., by addition of a solution comprising citric acid monohydrate in water (added water vs. oil equals 4.8% w/w; [citric acid] in water phase=106 mM, in water/oil emulsion=4.6 mM) for 30 minutes;

ii) transferring 10 ml of the pre-treated water in oil emulsion to a tube;

iii) heating the emulsion in a boiling water bath for 30 minutes;

iv) centrifuging at 5000 rpm for 10 minutes, v) transferring about 8 ml of the upper (oil) phase to a new tube and leaving it to settle for 24 hours; and vi) thereafter drawing 2 g from the upper clear phase for measurement of the non-hydratable phosphorus content (ppm) in the edible oil;

and wherein said method comprises, contacting said oil at a pH from 1.5–8 with an aqueous solution of a phospholipase $A_1$, a phospholipase $A_2$, or a phospholipase B, which solution is emulsified in the oil until the phosphorus content of the oil is reduced to less than 11 ppm, and then separating the aqueous phase from the treated oil.

In another aspect the invention relates to a new cloned phospholipase.

Further investigations into the nature of the lipase activity found in *Fusarium oxysporum,* DSM 2672 (and described in EP 130,064) revealed that the isolated fraction comprises several components having lipase activity of which one exhibited phospholipase activity.

Despite a number of technical difficulties (vide infra), the present inventors have been able to clone an enzyme exhibiting phospholipase A activity from a strain of the genus Fusarium, more specifically *Fusarium oxysporum.*

This is the first time a filamentous fungal phospholipase A has been cloned and consequently, the present invention provides a cloned DNA sequence encoding a filamentous fungal phospholipase A enzyme.

Accordingly, an aspect of the invention relates to a cloned DNA sequence encoding a polypeptide having phospholipase A activity wherein the DNA sequence is obtained from a filamentous fungus.

A cDNA sequence encoding a phospholipase B from *Penicillum notatum* is described in Eur. J. Biochem 202:783–787, 1991.

However, this DNA sequence shows only a very limited DNA identity of 39% to the DNA sequence of the present invention (SEQ ID NO 1 23–1060), and further, a physiological characteristic such as molecular mass varies considerably between said PLB from *P. notatum* (66 kDa) and a phospholipase of the invention (29±10 kDa (vide infra)).

Further, a comparison with prior art nucleotide and is amino acid sequences has shown that the DNA sequence and/or the corresponding encoded amino acid sequence of the invention has only little homology to any prior art DNA and/or amino acid sequences (vide infra).

Consequently, it is presently believed that the DNA sequence information provided in the present application will be highly valuable in order to e.g. clone another related/homologous phospholipase encoding DNA sequence, since a specific hybridization probe and/or PCR primers can now easily be constructed on the basis of said DNA sequence of the invention.

Further, it is presently believed that it is possible to clone both a related/homologous phospholipase A and/or phospholipase B encoding DNA sequence based on the sequence information provided in the present application.

Accordingly, in a further aspect the invention relates to a cloned DNA sequence encoding an enzyme exhibiting phospholipase A and/or phospholipase B activity, which DNA sequence is selected from the group comprising:

(a) the phospholipase A encoding part of the DNA sequence cloned into plasmid pYES 2.0 present in *Escherichia coli* DSM 11299;

(b) the DNA sequence shown in positions 23–1063 in SEQ ID NO 1, more preferably positions 113–1063 in SEQ ID NO 1, or even more preferably positions 113–929 in SEQ ID NO 1, or its complementary strand;

(c) a DNA sequence which is at least 70% homologous with said DNA sequences defined in (a) or (b);

(d) a DNA sequence defined in (a) or (b), which encodes a polypeptide exhibiting phospholipase activity and is at least 70% homologous with the polypeptide sequence shown in positions 31–346 of SEQ ID No 2, or more preferably at least 70% homologous with the polypeptide sequence shown in positions 31–303 of SEQ ID No 2;

(e) a DNA sequence which hybridizes with a double-stranded DNA probe comprising the DNA sequence shown in positions 23-1063 in SEQ ID NO 1 at low stringency;

(f) a DNA sequence which encodes for a polypeptide having the same amino acid sequences at position residues 1 to 346, 31 to 303 or 31 to 303 of SEQ ID No 2, or the amino acid sequences encosed by any of the DNA sequences of (e); and (g) a DNA sequence which is a fragment of the DNA sequences specified in (a), (b), (c), (d), (e), or (f).

Further, a phospholipase of the invention has been intensively characterized and it has been found that it has phospholipase activity at low pH; this property makes it very suitable for use in oil degumming. The phospholipase is not membrane bound, which makes it suitable for commercial production and purification.

Accordingly, in a further aspect the invention relates to an isolated polypeptide having phospholipase A activity, which polypeptide is obtained from a strain of the genus Fusarium and has i) PLA activity in the pH range 3–10, measured at 40° C.;
ii) a molecular mass of 29±10 kDa, as determined by SDS-PAGE;
iii) an isoelectric point (pI) in the range 4.5–8;
iv) a temperature optimum for phospholipase activity in the range between 25–55° C., measured with lecithin as substrate at pH 5; and/or
v) a pH optimum for phospholipase activity in the pH range between 6–12, measured with lecithin as substrate at 37° C.

A deduced amino acid sequence of an isolated phospholipase of the invention is shown in SEQ ID No 2. The N-terminal amino acid sequence of a mature secreted isolated phospholipase has been determined. Said N-terminal sequence showed that the mature part of a phospholipase of the invention, having the amino acid sequence shown in SEQ ID No 2, starts at amino acid No 31 in SEQ ID No 2. See working example herein for further details (vide infra).

Further, the C-terminal sequence of an active secreted phospholipase of the invention, having the amino acid sequence shown in SEQ ID No 2, has been determined. Said C-terminal determined phospholipase was recombinantly expressed in the filamentous fungal strain *Aspergillus oryzae*. See working example herein for further reference.

These results showed that the enzyme was C-terminal processed during expression from *A. oryzae*, and the results indicate that the Ser303 in SEQ ID NO 2 is the most likely C-terminal residue in the expressed mature active enzyme. However, it is foreseen that even further C-terminal processing may occur (i.e. giving a fragment of said sequences), and still having an expressed mature active enzyme.

Accordingly, in a further aspect the invention relates to an isolated enzyme exhibiting phospholipase A and/or B activity and being selected from the group comprising:

(a) a polypeptide encoded by the phospholipase A and/or B enzyme encoding part of the DNA sequence cloned into plasmid PYES 2.0 present in *Escherichia coli* DSM 11299;
(b) a polypeptide having an amino acid sequence as shown in positions 31–346 of SEQ ID NO 2;
(c) a polypeptide having an amino acid sequence as shown in position 31–303 of SEQ ID NO 2;
(d) an analogue of the polypeptide defined in (a), (b) or (c) which analogue is at least 70% homologous with said polypeptide; and
(e) a fragment of (a), (b) (c) or (d).

In a still further aspect the invention provides a recombinant expression vector, which enables heterologous recombinant production of an enzyme of the invention. Thereby it is possible to make a highly purified phospholipase composition, characterized in being free from homologous impurities. This is highly advantageous for a number of industrial applications.

The present invention demonstrates experimentally (vide infra) that a phospholipase obtained from both a strain of *Fusarium culmorum* and *Fusarium oxysporum* has improved properties for use in industrial relevant applications. It is foreseen that phospholipases obtained from a strain of the genus Fusarium will have improved properties relevant for use in industrial relevant applications.

Accordingly, in an even further aspect the invention relates is to the use of a phospholipase obtained from a strain of the genus Fusarium, such as a strain of *F. culmorum, F. heterosporum, F. solani*, or in particular a strain of *Fusarium oxysporum*, in a process comprising treatment of a phospholipid or lysophospholipid with the phospholipase so as to hydrolyze fatty acyl groups.

Finally, the invention relates to an isolated, substantially pure biological culture of the *Escherichia coli* strain DSM No. 11299 harbouring a phospholipase encoding DNA sequence (the phospholipase encoding part of the DNA sequence cloned into plasmid pYES 2.0 present in *Escherichia coli* DSM 11299) obtained from a strain of the filamentous fungus *Fusarium oxysporum*, or any mutant of said *E. coli* strain having retained the phospholipase encoding capability.

Sequence homology comparison with prior art

A homology search with the phospholipase of the invention against nucleotide and protein databases was performed. The homology search showed that the closest related known sequence was a lipase from *Fusarium heterosporum* (an amino acid alignment is illustrated in FIG. 1).

The DNA sequence of the invention (SEQ ID NO 1 23–1060) encoding the phospholipase shows only 62% DNA homology to the known lipase sequence from *Fusarium heterosporum* (Genbank database reference S77816), and the corresponding amino acid sequence of the phospholipase of the invention (SEQ ID NO 2) shows only 60% homology to a deduced amino acid sequence based on the known DNA sequence above (see FIG. 1).

This shows that the DNA and/or the amino acid sequence of a phospholipase of the invention indeed is different from any known DNA and/or amino acid sequence(s).

A cDNA sequence encoding a phospholipase B from *Penicillum notatum* is described (Eur. J. Biochem 202:783–787, 1991). However, this DNA sequence (Genbank database reference X60348) shows only very limited DNA identity 39%, to the DNA sequence of the present invention (SEQ ID NO 1, 23–1060), and the corresponding amino acid sequence of the phospholipase of the invention (SEQ ID NO 2) shows only 20% identity to a deduced amino acid sequence based on the known PLB DNA sequence above.

The calculation of homology was done as described later in this specification.

DRAWINGS

Figure 1:
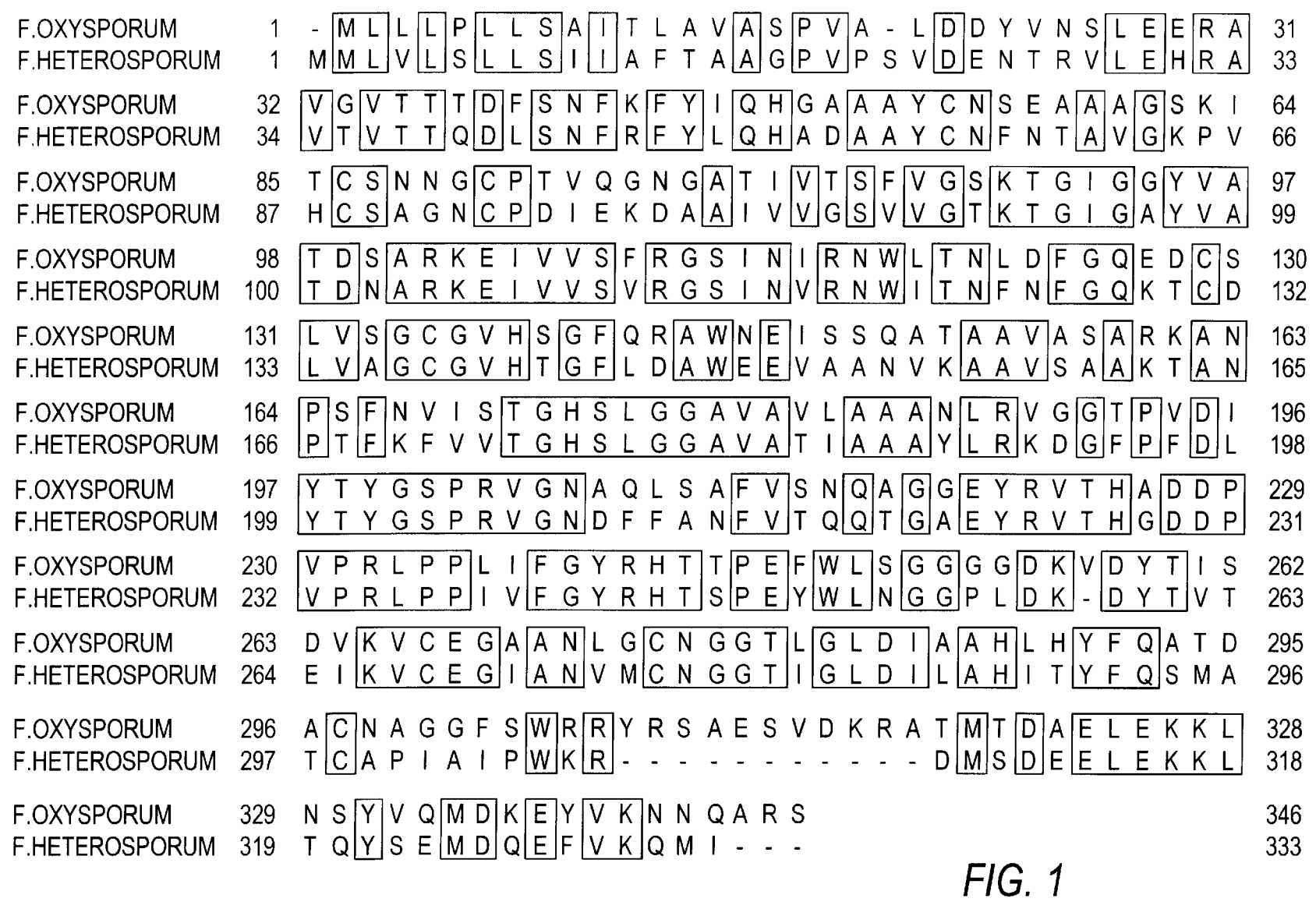

FIG. 1 Alignment of the amino acid sequence shown in SEQ ID No 2 with a prior art lipase sequence from *Fusarium heterosporum* (SEQ ID No 3).

FIG. 2 Comparison of enzymatic degumming capacity of Lecitase™ and a phospholipase from *Fusarium oxysporum* according to the invention.

DEFINITIONS

Prior to discussing this invention in further detail, the following terms will be defined.

"A cloned DNA sequence": The term "A cloned DNA sequence" refers to a DNA sequence cloned in accordance with standard cloning procedures used in genetic engineering to relocate a segment of DNA from its natural location to a different site where it will be reproduced. The cloning process involves excision and isolation of the desired DNA segment, insertion of the piece of DNA into the vector molecule and incorporation of the recombinant vector into a cell where multiple copies or clones of the DNA segment will be replicated.

The "cloned DNA sequence" of the invention may alternatively be termed "DNA construct" or "a cloned polynucleotide having a DNA sequence" "isolated DNA sequence".

"Obtained from": For the purpose of the present invention the term "obtained from", as used herein in connection with a specific microbial source, means that the enzyme and consequently the DNA sequence encoding said enzyme is produced by the specific source or by a cell in which a gene from the source has been inserted.

"An isolated polypeptide": As defined herein the term, "an isolated polypeptide" or "isolated phospholipase", as used about the phospholipase of the invention, is a phospholipase or phospholipase part which is essentially free from other non-phospholipase polypeptides, e.g., at least 20% pure, preferably at least 40% pure, more preferably 60% pure, even more preferably 80% pure, most preferably 90% pure, and even most preferably 95% pure, as determined by SDS-PAGE.

When the isolated polypeptide is at least 60% pure the term "A highly isolated polypeptide" may be used. The "isolated polypeptide" may alternatively be termed "purified polypeptide".

"Homologous impurities": As used herein the term "homologous impurities" means any impurity (e.g. another polypeptide than the enzyme of the invention) which originates from the homologous cell from which the enzyme of the invention is originally obtained. In the present invention the homologous cell may e.g. be a strain of *Fusarium oxysporum*.

"Phospholipase encoding oart": As used herein the term "phospholipase encoding part" used in connection with a DNA sequence means the region of the DNA sequence which corresponds to the region which is translated into a polypeptide sequence.

In the DNA sequence shown in SEQ ID NO 1 it is the region between the first "ATG" start codon ("AUG" codon in mRNA) and the following stop codon ("TAA", "TAG" or "TGA").

The translated polypeptide may further, in addition to the mature sequence exhibiting phospholipase activity, comprise an N-terminal signal and/or a pro-peptide sequence. The signal sequence generally guides the secretion of the polypeptide and the pro-peptide generally guides the folding of the polypeptide. For further information see Egnell, P. et al. Molecular Microbiol. 6(9):1115–19 (1992) or Stryer, L., "Biochemistry" W.H., Freeman and Company/New York, ISBN 0-7167-1920-7.

"Modification(s) of a DNA and/or amino acid sequence" The term "modification(s)" used in connection with modification(s) of a DNA and/or amino acid sequence as discussed herein is defined to include chemical modification as well as genetic manipulation(s). The modification(s) may be substitution, deletion and/or insertion in or at the amino acid(s) of interest.

"Phospholipase A": The term "Phospholipase A" used herein in connection with an enzyme of the invention is intended to cover an enzyme with Phospholipase A1 and/or Phospholipase A2 is activity.

Phospholipase A1 is defined according to standard enzyme EC-classification as EC 3.1.1.32.

Official Name: Phospholipase A1 (PLA1).
Reaction catalyzed:
  phosphatidylcholine+H(2)O< >
  2-acylglycerophosphocholine+a fatty acid anion
Comment(s)
  has a much broader specificity than ec 3.1.1.4.
Phospholipase A2 is defined according to standard enzyme EC-classification as EC 3.1.1.4

Official Name: phospholipase A2 (PLA2).
Alternative Name(s): phosphatidylcholine 2-acylhydrolase. lecithinase a; phosphatidase; or phosphatidolipase.
Reaction catalysed:
  phosphatidylcholine+h(2)o< >
  1-acylglycerophosphocholine+a fatty acid anion
comment(s): also acts on phosphatidylethanolamine, choline plasmalogen and phosphatides, removing the fatty acid attached to the 2-position.

"Phospholipase B": Phospholipase B is defined according to standard enzyme EC-classification as EC 3.1.1.5.
Official Name: lysophospholipase.
Alternative Name(s): lecithinase b; lysolecithinase; phospholipase b; or plb.
Reaction catalysed:
  2-lysophosphatidylcholine+h(2)o<>glycerophosphocholine+a fatty acid anion "Phospholipase activity": The term "phospholipase activity" or "having/exhibiting phospholipase activity" as used herein in connection with an enzyme of the invention is intended to specify an enzyme having at least the amount of phospholipase activity (be it PLA or PLB) experimentally defined below.

Accordingly, an enzyme which exhibits phospholipase activity is herein defined as an enzyme which in the "monolayer phospholipase assay" shown in Example 6 herein (vide infra) has a phospholipase activity of at least 0.25 nmol/min, enzyme dose: 60 $\mu$g, at 25° C.; more preferably at least 0.40 nmol/min, enzyme dose: 60 $\mu$g, at 25° C.; more preferably at least 0.75 nmol/min, enzyme dose: 60 $\mu$g, at 25° C.; more preferably at least 1.0 nmol/min, enzyme dose: 60 $\mu$g, at 25° C.; more preferably at least 1.25 nmol/min, enzyme dose: 60 $\mu$g, at 25° C.; and even more preferably at least 1.5 nmol/min, enzyme dose: 60 $\mu$g, at 25° C.

It is presently believed that only an enzyme having such a significant phospholipase activity is of industrial importance, for instance for use in degumming (U.S. Pat. No. 5,264,367).

"A lipase with phospholipase side activity": The term "lipase with phospholipase side activity" is accordingly defined as a lipase with a phospholipase side activity wherein the phospholipase side activity in the "monolayer phospholipase assay" shown in Example 6 is less than the above mentioned figures.

A number of lipases have such phospholipase side activity. In working example 6 herein (vide infra) some of the lipases having phospholipase side activity are shown.

"A crude oil": A crude oil (also called a non-degummed oil) may be a pressed or extracted oil or a mixture thereof from e.g. rapeseed, soybean, or sunflower. The phosphatide content in a crude oil may vary from 0.5–3% w/w corresponding to a phosphorus content in the range of 200–1200 ppm, more preferably in the range of 250–1200 ppm. Apart from the phosphatides the crude oil also contains small concentrations of carbohydrates, sugar compounds and metal/phosphatide acid complexes of Ca, Mg and Fe.

"A semicrude oil": Any oil which is not a crude oil, but which has a phosphatide content above 250 ppm, more preferably above 500 ppm. Such an oil could e.g. be achieved by subjecting a crude oil to a process similar to the "water degummed oil" process described below.

"A water-degummed oil": A water-degummed oil is typically obtained by mixing 1–3% w/w of hot water with warm (60–90° C.) crude oil. Usual treatment periods are 30–60 minutes. The water-degumming step removes the phosphatides and mucilaginous gums which become insoluble in the oil when hydrated. The hydrated phosphatides and gums can be separated from the oil by settling, filtering or centrifuging—centrifuging being the more prevalent practice.

The essential object in said water-degumming process is to separate the hydrated phosphatides from the oil. The mixing of hot water into the oil, described above, should herein be understood broadly as mixing of an aqueous solution into the oil according to standard water-degumming procedures in the art.

Alternatively, the process here termed "A water-degummed oil" may be called "wet refining to remove mucilage" (see U.S. Pat. No. 5,264,367).

DETAILED DESCRIPTION OF THE INVENTION

Figure 2:
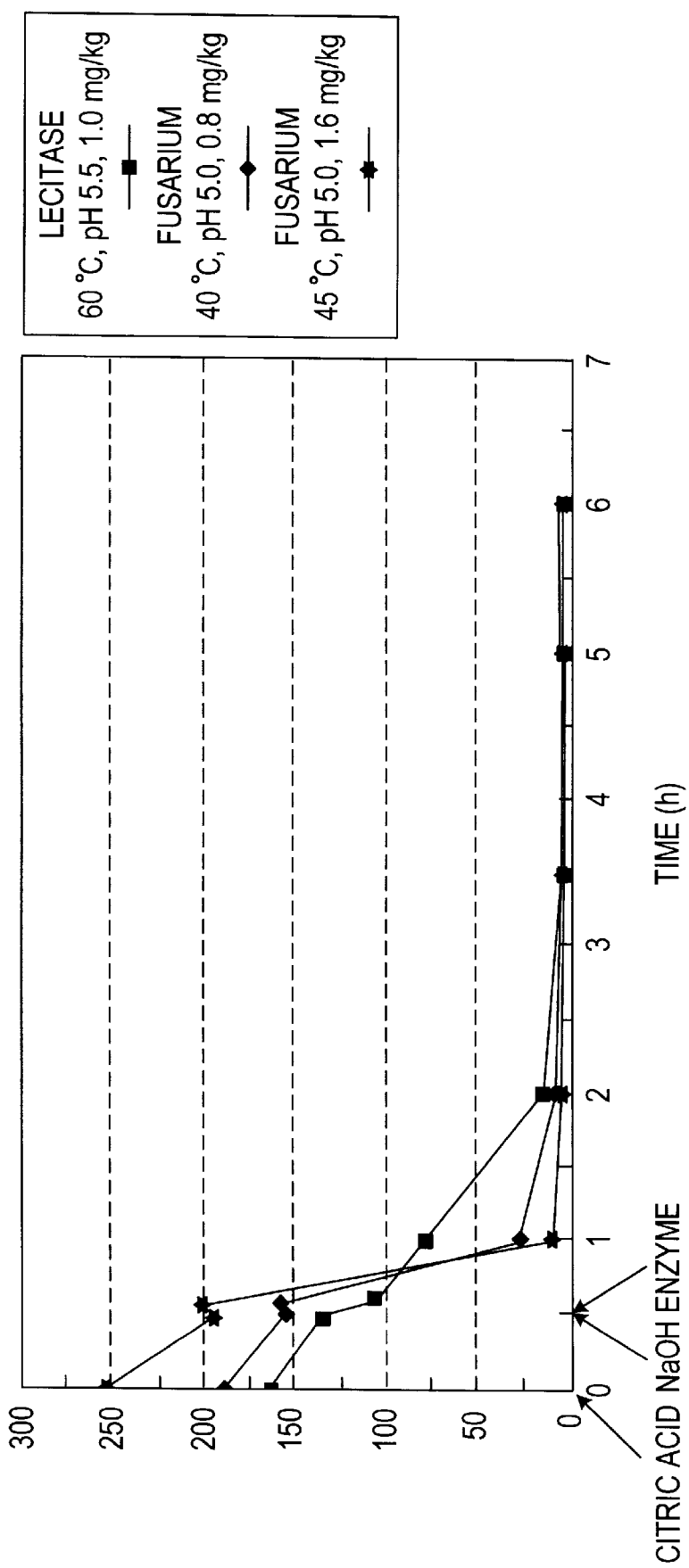

For the present invention the amount of non-hydratable phosphorus in an edible oil is measured by, i) pre-treating the edible oil, at 60° C., by addition of a solution comprising citric acid monohydrate in water (added water vs. oil equals 4.8% w/w; [citric acid] in water phase=106 mM, in water/oil emulsion=4.6 mM) for 30 minutes;

ii) transferring 10 ml of the pre-treated water in oil emulsion to a tube;

iii) heating the emulsion in a boiling water bath for 30 minutes;

iv) centrifuging at 5000 rpm for 10 minutes, v) transferring about 8 ml of upper (oil) phase to a new tube and leaving it (to settle) for 24 hours;

vi) after settling drawing 2 g from upper clear phase for measurement of the non-hydratable phosphorus content (ppm) in the edible oil.

For further details reference is made to working examples herein.

As illustrated in working examples herein the phospholipid composition (hydratable vs. non-hydratable phospholipid) of different edible oils varies considerably. Consequently, the level of remaining phospholipid in different water-degummed oils will vary over a wide range (e.g. from around 30 ppm to 200 ppm).

For enzymatic degumming, the optimal enzyme dosage is dependent on the amount of non-hydratable phosphatides present after water degumming or citric acid/water pre-treatment as defined above.

Further, the higher the amount of non-hydratable phosphatides present in the oil is, the more efficient is the enzymatic degumming method.

The present invention provides a method to remove the NHP content in oil comprising a relatively high amount of NHP.

Preferably, the edible oil comprises a non-hydratable phosphorus content of at least 60 ppm, more preferably at least 100 ppm, and even more preferably at least 200 ppm.

More preferably, the edible oil comprises a non-hydratable phosphorous content in the range of 60–500 ppm, more preferably in the range of 100–500 ppm, and even more preferably in the range of 200–500 ppm.

An edible oil defined as having a relatively high amount of a non-hydratable phosphorus, according to the description herein, may be a water degummed oil, or more preferably a crude-oil or a semi-crude oil.

Accordingly, an embodiment of the invention relates to a method according to the first aspect of the invention, wherein said edible oil is a crude oil, characterized in that said crude edible oil, prior to carrying out the method of the invention, is an oil with a phosphorus content above 250 parts per million (ppm), which oil has not been water-degummed (water degumming comprises mixing hot water into a warm crude oil followed by removing phosphatides which become insoluble in the oil when hydrated) prior to carrying out the method of the invention.

Preferably, such a crude edible oil has, prior to carrying out said method of the invention, a phosphorus content above 350 ppm, more preferably above 400 ppm, even more preferably above 500 ppm, and most preferably above 600 ppm.

Further, said crude edible oil preferably has, prior to carrying out said method of the invention, a phosphorus content in the range of 250–1500 ppm, more preferably in the range of 350–1500 ppm, even more preferably in the range of 500–1500 ppm, and most preferably in the range of 500–1500 ppm.

The enzymatic degumming method of a crude edible oil according to the invention is advantageous over the prior art method for enzymatic degumming of a water degummed edible oils (U.S. Pat. No. 5,264,367), since a direct enzymatic degumming method for treatment of a crude oil, according to the invention, will save the prior step of water degumming of the oil.

This saves both time and money. A water-degummed oil is typically obtained by mixing hot water into warm (60–90° C.) crude oil for usually 30–60 minutes. In contrast, the complete process of enzymatic degumming of crude oils according to the invention may be performed in less than 1 hour, with actual enzymatic treatment for around 25 minutes. See working example herein for further details.

Further, an edible oil defined as having a relatively high amount of a non-hydratable phosphorus, according to the description herein, may be a semi-crude oil.

Accordingly, an embodiment of the invention relates to a method according to the first aspect of the invention, wherein said edible oil is a semi-crude edible oil, characterized in that said semi-crude edible oil, prior to carrying out the method of the invention, has a phosphorus content above 500 parts per million (ppm), and wherein said oil has been water-degummed prior to carrying out the method of the invention.

Preferably, said semi-crude edible oil is an oil which, prior to carrying out said method, has a phosphorus content above 600 parts per million (ppm), more preferably above 750 parts per million (ppm).

In general, water degumming of an edible oil will reduce the phosphorous contents in the oil to a level below 500 ppm.

Accordingly, a semi-crude oil as described herein may e.g. only have been partly water-degummed prior to carrying out a method for reducing the level of phosphorus containing components in an edible oil according to the invention.

The term "partly water degummed" denotes that the water degumming procedure of the oil has only been a partial/short process as compared to a standard water-degumming procedure.

A "partly water degumming" process may be performed by only mixing only 0.5% of hot water into the oil (standard is 1–3% hot water. See section "Definitions" herein), or by reducing the treatment period to 10 minutes (standard is 30–60 minutes).

Alternatively, a semi-crude oil as defined herein, may be a mixture of a crude oil and a semi-crude oil.

An embodiment of the invention relates to a method according to any of the first aspect of the invention, which comprises the following steps:

i) adjusting the temperature of the edible oil to a temperature between 25° C.–70° C.;
ii) pre-treating the edible oil to the above adjusted temperature by adding 0.5–6% (by weight relative to the oil) of an aqueous solution comprising at least 85% water for 5–120 minutes, wherein said pre-treatment is not followed by removal of hydrated mucilage and phosphorous content in the oil;
iii) adjusting the pH of the water/oil emulsion to a pH between 1.5–8 (e.g. by addition of a suitable amount of a NaOH solution);
iv) contacting the water/oil emulsion with an aqueous solution of a phospholipase (at a temperature (+/–5° C.) adjusted according to step i), which phospholipase is emulsified in the oil until the phosphorus content of the oil is reduced to less than 11 ppm;
v) separating the aqueous phase from the treated oil.

The temperature of the edible oil in step i) immediately above is preferably adjusted to a temperature which is the optimal phospholipase activity temperature of the enzyme used in the method.

For the commercially available phospholipase Lecitase™ (Novo Nordisk A/S) this is around 60° C., and for a phospholipase of the invention obtained from the filamentous fungus genus Fusarium, it is around 45° C. See working examples herein for further details relating to this issue.

It is foreseen that a majority of filamentous fungal phospholipases will have a temperature optimum around 35–50° C.

Accordingly, an embodiment of the invention relates to the method described immediately above, wherein the temperature of the edible oil in step i) is adjusted to a temperature between 35° C.–50° C., and the phospholipase used in step iv) is obtained from a filamentous fungus strain.

In step ii) of the method above, the edible oil is pretreated at the adjusted temperature (step i)) by addition of 0.5–6% (by weight relative to the oil) of an aqueous solution comprising at least 85% water for 5–120 minutes, and wherein said pre-treatment is not followed by removal of hydrated mucilage and phosphorous content in the oil.

This step is a standard pre-treatment step in enzymatic degumming of edible oils (U.S. Pat. No. 5,264,367; U.S. Pat. No. 5,558,781). The purpose of step ii) is to hydrate the hydratable/hydrophilic components (such as the hydratable phosphorous content) in the edible oil, which when hydrated becomes insoluble in the oil.

However, this step is different from what is termed "water-degumming of an edible oil" in the present context. One major difference is that said pre-treatment step does not remove the hydrated phosphatides and mucilage from the oil. Removal of said hydrated content from the oil is the main purpose of water-degumming of edible oils.

Accordingly, when the phospholipase is contacted with the oil in step iv) above, the oil still comprises said hydrated phosphatides and mucilage.

In other words, if the edible oil is a non-water degummed edible oil, the method above describes a simplified enzymatic degumming method, which does not remove the hydrated phosphatides and mucilage from the oil prior to contacting said oil with the phospholipase.

Preferably, the aqueous solution comprising at least 85% water (step ii above) further comprises citric acid. Preferably, there is between 1–15% (w/w) citric acid in said aqueous solution, more preferably there is between 3–11% (w/w) citric acid in said aqueous solution.

Preferably, the time period in step ii) is 15–50 minutes, and more preferably 15–30 minutes.

For further details relating to said pre-treatment in step ii) above reference is made to working examples herein.

In step iii) above the pH of the water/oil emulsion is adjusted to pH 1.5–8 (e.g. by addition of a suitable amount of a NaOH solution). This is done in order to adjust the pH value of the oil before the phospholipase is contacted with oil in step iv). In general, the actual optimal pH value will depend on the actual enzyme used to contact the oil in step iv). For further details relating to this issue reference is made to working examples herein.

In general it is preferred, according to the first aspect and their embodiments of the invention, that the contacting of said oil with an aqueous solution comprising a phospholipase is performed at pH 1.5–6, more preferably at pH 3–6.

The pH value in the water in the oil emulsion is measured by taking 2 ml of water from the oil emulsion and mix them with 2 ml of water. After phase separation, the resulting top oil layer is to be pipetted off, and the pH is to be measured in aqueous phase. Measurements are transformed to "real" pH values by the following formula $pH_{real}=pH_{measured}-0.38$. For further details reference is made to working examples herein.

Preferably, in a method for reducing the amount of phosphorus containing components in an edible oil according to the invention, the amount of a phospholipase which is emulsified in the oil is in the range of 0.1–15 mg enzyme (dry matter)/kg oil, more preferably 0.25–5 mg enzyme (dry matter)/kg oil, and even more preferably 0.25–2.5 mg enzyme (dry matter)/kg oil.

In general, is it advantageous to optimize both the amount of phospholipase used, and the time used for enzymatic degumming of an edible oil to obtain a phosphorus content below 11 ppm. The actual optimal enzyme dose and time period will, i.a., depend on the actual phospholipase used. For further details relating to optimization of enzyme dosage and time period of the method, reference is made to working examples herein.

Preferably, in a method for reducing the amount of phosphorus containing components in an edible oil according to the invention, the phosphorus content of the oil is reduced to less than 11 ppm after contacting said oil with 0.5–6 mg phospholipase (dry matter)/kg oil, and wherein the phospholipase is in contact with said oil for a time period of 1–6 hours, more preferably the phosphorus content of the oil is reduced to less than 11 ppm after contacting said oil with between 0.25–2.5 mg phospholipase (dry matter)/kg oil, and wherein the phospholipase is in contact with said oil for a time period of 15 minutes to 2 hours.

See working examples herein for further details relating to identification of optimal temperatures for individual phospholipases.

Preferably, in all aspects and embodiments of a method for reducing the amount of phosphorus containing components in an edible oil according to the invention, the phosphorus content of the oil is reduced to less than 5 ppm.

The phosphorus content in the oil is measured as parts per million (ppm) in the oil phase of the water present in the oil emulsion. The phosphorus content analysis is carried out according to procedure 2.421 in "Standard Methods for the Analysis of Oils, Fats, and Derivatives, 7th ed. (1987)". For further details reference is made to working examples herein.

An embodiment of the invention relates to a method for reducing the amount of phosphorus containing components in an edible oil according to the invention, wherein the phospholipase is obtained from a mammalian species, in particular wherein the phospholipase is obtained from a pancreas in said mammalian species, and most preferably wherein the phospholipase is obtained from a porcine pancreas.

Preferably, in a method for reducing the amount of phosphorus containing components in an edible oil according to the invention, the phospholipase is obtained from a microorganism, preferably a filamentous fungus, a yeast, or a bacterium.

Preferably, when said filamentous fungus mentioned immediately above, is a species within the genus Fusarium, referred strains are strains such as a strain of *F. culmorum, F. heterosporum, F. solani,* or in particular a strain of *F. oxysporum.*

Further, when said filamentous fungus above is a species within the genus Aspergillus, preferred strains are strains such as a strain of *Aspergillus awamori, Aspergillus foetidus, Aspergillus japonicus, Aspergillus niger* or in particular *Aspergillus oryzae.*

Further, in a method for reducing the amount of phosphorus containing components in an edible oil according to the invention, the edible oil is preferably a soybean oil, sunflower seed oil, or more preferably a rapeseed oil.

Characterization of Phospholipase obtained from *Fusarium oxysporum.*

A phospholipase of the invention obtained from *Fusarium oxysporum* has been intensively characterized.

Accordingly, an aspect of the invention is preferably an isolated Phosholipase A which is obtained from a strain of the genus Fusarium and has phospholipase A activity in the pH range 3–10 measured at 40° C., more preferably having phospholipase A activity in the pH range 3–7 measured at 40° C., more preferably having phospholipase A activity in the pH range 3.5–6 measured at 40° C., and even more preferably having phospholipase A activity in the pH range 4.5–5.5 measured at 40° C.

The phospholipase A activity was determined with Soybean Lecithin as substrate NEFA test bases assay), or in a buffer comprising 2% Lecithin, 2% Triton X-100, 20 mM Britton-Robinson (BR). See working examples herein for further details.

In a further embodiment of the invention, an isolated Phosholipase A, which is obtained from a strain of the genus Fusarium, is preferably one which has a molecular mass of 29±10 kDa, more preferably a molecular mass of 29±5 kDa, even more preferably a molecular mass of 29±3 kDa, and most preferably a molecular mass of 29±2 kDa.

The molecular mass is measured by SDS-PAGE electrophoresis as further described in the "Materials and Methods" section (vide infra).

In a further embodiment of the invention, an isolated Phosholipase A which is obtained from a strain of the genus Fusarium is preferably one which has an isoelectric point (pI) in the range 4.5–8, more preferably an isoelectric point (pI) in the range 5–7.5, and even more preferably an isoelectric point (pI) in the range 5.5–7.5.

The Isoelectric point (pI) was determined by using Ampholine PAGE plates from Pharmacia. See working example herein for further details (vide infra).

In a further embodiment of the invention, an isolated Phosholipase A which is obtained from a strain of the genus Fusarium is preferably one which has a temperature optimum for phospholipase activity in the range between 25–55° C., measured with lecithin as substrate at pH 5; more preferably in the range of 30–50° C., measured with lecithin as substrate at pH 5, and even more preferably in the range of 40–50° C., measured with lecithin as substrate at pH 5.

The temperature optimum for phospholipase activity was measured in a buffer comprising 2i lecitihn, 2% Triton X-100, 20 mM Britton Robinson buffer, at pH 5. See working example herein for further details (vide infra).

In a still further embodiment of the invention, an isolated Phospholipase A which is obtained from a strain of the genus Fusarium is preferably one which has phospholipase activity pH optimum in the pH range of 6–12, at 37° C.; more preferably in the pH range of 7–11.5, at 37° C.; more preferably in the pH range of 8–11, at 37° C.; and even more preferably in the pH range of 8.5–11, at 37° C.

The phospholipase activity pH optimum was determined in a buffer comprising 2% Lecithin, 2% Triton X-100, 20 mM Britton-Robinson (BR), at 37° C. See working examples herein for further details.

Preferably, a phospholipase of the invention comprises at least two out of the five (numbered i) to v)) above mentioned physical characteristics of the enzyme, more preferably a phospholipase of the invention comprises at least three out of the five (numbered i) to v)) above mentioned physical characteristics of the enzyme, even more preferably a phospholipase of the invention comprises at least four out of the five (numbered i) to v)) above mentioned physical characteristics of the enzyme, and most preferably a phospholipase of the invention comprises all of the five (numbered i) to v)) above mentioned physical characteristics of the enzyme.

As described above, a phospholipase of the invention has been cloned, recombinantly expressed, purified, and the N-terminal and C-terminal sequences of the active secreted enzyme have been determined.

Accordingly, a further embodiment of the invention relates to an isolated polypeptide having phospholipase A activity which polypeptide is obtained from a strain of the genus Fusarium and has
i) PLA activity in the pH range 3–10, measured at 40° C.;
ii) a molecular mass of 29±10 kDa, as determined by SDS-PAGE;
iii) an isoelectric point (pI) in the range 4.5–8;
iv) a temperature optimum for phospholipase activity in the range of 25–55° C., measured with lecithin as substrate at pH 5; and/or
v) a phospholipase activity pH optimum in the pH range of 6–12, measured with lecithin as substrate at 37° C.;
and further comprises an amino acid sequence selected from the group comprising:
(a) a polypeptide encoded by the phospholipase A enzyme encoding part of the DNA sequence cloned into plasmid pYES 2.0 present in *Escherichia coli* DSM 11299;
(b) a polypeptide having an amino acid sequence as shown in positions 31–346 of SEQ ID NO 2;
(c) a polypeptide having an amino acid sequence as shown in position 31–303 of SEQ ID NO 2;
(d) an analogue of the polypeptide defined in (a), (b) or (c) which is at least 70% homologous with said polypeptide; and
(e) a fragment of (a), (b) (c) or (d).

In an embodiment of the invention, the isolated polypeptide having phospholipase activity according to the invention is phospholipase having phospholipase A1 activity.

In a further embodiment, the isolated polypeptide having phospholipase activity according to the invention is phospholipase having a phospholipase A2 activity, and in an even further embodiment the isolated polypeptide having phospholipase activity according to the invention is a phospholipase having phospholipase B activity.

Preferably, said isolated polypeptide having phospholipase is activity according to the invention, is phospholipase having phospholipase A1 activity.

For specific examples of standard techniques to measure individual PLA1, PLA2 and/or PLB activity reference is made to working examples herein.

In a further embodiment the invention relates to an isolated polypeptide having phospholipase activity according to the invention, wherein the phospholipase is a phospholipase which is substantially independent of $Ca^{2+}$ concentration measured as, relative phospholipase activity at 5 mM EDTA and 5mM $Ca^{2+}$ in a phospholipase activity assay measuring release of free fatty acids from lecithin in a buffer comprising 2% lecithin, 2% Triton X-100, 20 mM citrate, pH 5; incubated for 10 min. at 37° C. followed by stop of reaction at 95° C. for 5 min.; wherein the ratio of relative phospholipase activity at 5mM EDTA/5 mM $Ca^{2+}$ is greater than 0.25, more preferably greater than 0.5, and most preferably greater than 0.80.

For further details relating to measurement of the dependence of the enzyme activity on the Ca2+ concentration, reference is made to working examples herein.

Some lipases may have limited phospholipase activity. In the present context such limited phospholipase activity of said lipases are defined as "a lipase with phospholipase side activity" (see section "Definitions" herein). The present invention relates to an isolated polypeptide having phospholipase activity, wherein in phospholipase activity of said isolated polypeptide is as high as it is of industrial relevance.

Accordingly, the invention relates to an isolated polypeptide having phospholipase activity according to the invention, wherein the phospholipase is a phospholipase having a phospholipase activity which is at least 0.25 nmol/min, enzyme dose: 60 µg, at 25° C.; more preferably at least 0.40 nmol/min, enzyme dose: 60 µg, at 25° C.; measured in a monolayer phospholipase assay as follows:

a. in a monolayer equipment (zero-order through) on a thoroughly purified surface of a buffer solution (10 mM TRIS, pH 8.0, 25° C.) a monolayer of the phospholipid DDPC (Di Dicanoyl (C10) Phosphatidyl Choline) is spread from a chloroform solution;
b. after relaxation of the monolayer (evaporation of chloroform), the surface pressure is adjusted to 15 mN/m, corresponding to a mean molecular area of DDPC of approx. 63 Å$^2$/molecule;
c. a buffer solution (as above) containing 60 µg enzyme is injected through the monolayer into the subphase of the reaction compartment (cylinder with area 1520 mm$^2$ and volume 30400 mm$^3$) in the "zero-order trough";
d. enzymatic activity is determined through the speed of a mobile barrier compressing the monolayer in order to maintain constant surface pressure as insoluble substrate molecules are hydrolysed into more water soluble reaction products, where the number of DDPC-molecules hydrolyzed per minute by the enzyme is estimated from the mean molecular area (MMA) of DDPC.

See section "Definitions" and working examples herein for further descriptions of preferred amounts of phospholipase activities for an isolated polypeptide having phospholipase activity according to the invention.

Further, the specific phospholipase activity of a phospholipase according to the invention may be measured by known standard phospholipase activity assays.

Accordingly, in a further embodiment the present invention relates to an isolated polypeptide having phospholipase activity according to the invention, wherein the phospholipase is a phospholipase which has a phospholipase activity capable of releasing at least 7 µmol of free fatty acid/min./mg enzyme; more preferably at least 15 µmol of free fatty acid/min./mg enzyme; even more preferably at least 30 µmol of free fatty acid/min./mg enzyme, and most preferably at least 50 µmol of free fatty acid/min./mg enzyme measured as follows:

phospholipase activity is measured in an assay measuring release of free fatty acids from lecithin in a buffer comprising 2% lecithin, 2% Triton X-100, 20 mM citrate, pH 5; incubated for 10 min. at 37° C. followed by stop of reaction at 95° C. for 5 min.

For further details relating to this embodiment of the invention reference is made to working examples herein.

An isolated polypeptide having phospholipase activity according to the invention is very suitable for performing enzymatic degumming of an edible oil.

Accordingly, the invention relates to:

1. an isolated polypeptide having phospholipase activity according to the invention, wherein the phospholipase is capable of performing enzymatic degumming of an edible oil, according to a method of the invention in order to reduce the amount of phosphorus containing components in an edible oil comprising a non-hydratable phosphorus content of at least 50 ppm; and
2. an isolated polypeptide having phospholipase activity according to the invention, wherein the phospholipase is capable of performing enzymatic degumming of a water-degummed edible oil (having a phosphorus content of 50–250 ppm) thereby reducing the phosphorus content of the oil to less than 11 ppm, wherein the enzymatic degumming process comprises contacting said oil at a pH from 1.5–8 with an aqueous solution of the phospholipase which is emulsified in the oil until the phosphorus content of the oil is reduced to less than 11 ppm, and then separating the aqueous phase from the treated oil.

Preferably, the isolated polypeptide having phospholipase activity according to the invention is capable of performing said enzymatic degumming process of the water-degummed edible oil (defined immediately above) in less than 1.5 hours, and uses less than 2 mg phospholipase (dry matter)/kg oil.

Preferably, an isolated polypeptide exhibiting phospholipase activity and having the characteristic shown above of the invention is obtained from a filamentous fungal strain within the genus of Fusarium.

However, without being limited to any theory it is at present contemplated that a phospholipase of the invention can also be obtained from another microorganism, preferably another filamentous fungal strain. Examples thereof are given in the section "Microbial sources" (vide infra).

Cloned DNA sequence

Despite a number of technical difficulties (See section "Protocol for cloning a filamentous fungal phospholipase", vide infra) the present inventors have been able to clone a phospholipase exhibiting PLA activity from a strain of the genus Fusarium, more specifically *Fusarium oxysporum*.

Further, it is presently believed that it is possible to clone both a related phospholipase A and/or phospholipase B encoding DNA sequence based on the sequence information provided in the present application.

Accordingly, an aspect of the invention relates to a cloned DNA sequence encoding an enzyme exhibiting phospholipase A and/or phospholipase B activity, which DNA sequence is selected from the group comprising:

(a) the phospholipase A encoding part of the polynucleotide cloned into plasmid pYES 2.0 present in *Escherichia coli* DSM 11299;
(b) the DNA sequence shown in positions 23–1063 in SEQ ID NO 1, more preferably positions 113–1063 in SEQ ID NO 1, or even more preferably positions 113–929 in SEQ ID NO 1, or its complementary strand;
(c) a DNA sequence which is at least 70% homologous with said DNA sequence defined in (a) or (b);

(d) a DNA sequence defined in (a) or (b), which encodes a polypeptide exhibiting phospholipase activity and is at least 70% homologous with the polypeptide sequence shown in positions 31–346 of SEQ ID No 2, or more preferably at least 70% homologous with the polypeptide sequence shown in positions 31–303 of SEQ ID No 2;

(e) a DNA sequence which hybridizes with a double-stranded DNA probe comprising the DNA sequence shown in positions 23–1063 in SEQ ID NO 1 at low stringency;

(f) a DNA sequence which encodes for a polypeptide having the amino acid sequences of residues 1 to 346, 31 to 346 or 31 to 303 of SEQ ID No 2 or the amino acid sequences encoded by any of the DNA sequences of (e); and (g) a DNA sequence which is a fragment of the DNA sequences specified in (a), (b), (c), (d), (e), or (f).

In this specification, whenever reference is made to the phospholipase encoding part of the DNA sequence cloned into plasmid pYES 2.0 present in DSM 11299 such reference is also intended to include the phospholipase encoding part of the DNA sequence presented in SEQ ID NO 1.

Accordingly, the terms "the phospholipase encoding part of the DNA sequence cloned into plasmid pYES 2.0 present in DSM 11299" and "the phospholipase encoding part of the DNA sequence presented in SEQ ID NO 1" may be used interchangeably.

The DNA sequence may be of genomic, cDNA, or synthetic origin or any combination thereof.

The present invention also encompasses a cloned DNA sequence which encodes an enzyme exhibiting phospholipase A and/or phospholipase B activity having the amino acid sequence set forth as the mature part of SEQ ID NO 2, which differs from SEQ ID NO 1 by virtue of the degeneracy of the genetic code.

The DNA sequence shown in SEQ ID NO 1 and/or an analogue DNA sequence of the invention may be cloned from a strain of the filamentous fungus *Fusarium oxysporum* producing the enzyme with phospholipase activity, or another or related organism as further described below (See section "Microbial sources").

Alternatively, the analogous sequence may be constructed on the basis of the DNA sequence presented as the phospholipase encoding part of SEQ ID No. 1, e.g. be a subsequence thereof, and/or be constructed by introduction of nucleotide substitutions which do not give rise to another amino acid sequence of the phospholipase encoded by the DNA sequence, but corresponds to the codon usage of the host organism intended for production of the enzyme, or by introduction of nucleotide substitutions which may give rise to a different amino acid sequence (i.e. a variant of the phospholipase of the invention).

When carrying out nucleotide substitutions, amino acid changes are preferably of a minor nature, i.e. conservative amino acid substitutions which do not significantly affect the folding or activity of the protein; small deletions, typically of one to about 30 amino acids; small amino- or carboxyl-terminal extensions, such as an amino-terminal methionine residue; a small linker peptide of up to about 20–25 residues; or a small extension that facilitates purification, such as a poly-histidine tract; an antigenic epitope or a binding domain.

Examples of conservative substitutions are within the group of basic amino acids, such as arginine, lysine, histidine; acidic amino acids, such as glutamic acid and aspartic acid; polar amino acids, such as glutamine and asparagine; hydrophobic amino acids, such as leucine, isoleucine, valine; aromatic amino acids, such as phenylalanine, tryptophan, tyrosine; and small amino acids, such as glycine, alanine, serine, threonine, methionine. For a general description of nucleotide substitution, see e.g. Ford et al., (1991), Protein Expression and Purification 2, 95–107.

It will be apparent to persons skilled in the art that such substitutions can be made outside the regions critical to the function of the molecule and still result in an active polypeptide. Amino acids essential to the activity of the polypeptide encoded by the cloned DNA sequence of the invention and therefore preferably not subject to substitution may be identified according to procedures known in the art, such as site-directed mutagenesis or alanine-scanning mutagenesis (cf. e.g. Cunningham and Wells, (1989), Science 244, 1081–1085). In the latter technique mutations are introduced at every residue in the molecule, and the resulting mutant molecules are tested for biological (i.e. phospholipase) activity to identify amino acid residues that are critical to the activity of the molecule. Sites of substrate-enzyme interaction can also be determined by analysis of crystal structure as determined by such techniques as nuclear magnetic resonance analysis, crystallography or photo affinity labelling (cf. e.g. de Vos et al., (1992), Science 255, 306–312; Smith et al., (1992), J. Mol. Biol. 224, 899–904; Wlodaver et al., (1992), FEBS Lett. 309, 59–64).

Polypeptides of the present invention also include fused polypeptides or cleavable fusion polypeptides, into which another polypeptide is fused at the N-terminal or the C-terminal of the polypeptide or fragment thereof. A fused polypeptide is produced by fusing a nucleic acid sequence (or a portion thereof) encoding another polypeptide to a nucleic acid sequence (or a portion thereof) of the present invention. Techniques for producing fused polypeptides are known in the art and include ligating the coding sequences encoding the polypeptides so that they are in frame and so that expression of the fused polypeptide is under control of the same promoter(s) and terminator.

The DNA sequence of the invention can be cloned from the strain *Escherichia coli* DSM No. 11299 using standard cloning techniques e.g. as described by Sambrook et al., (1989), Molecular Cloning: A Laboratory Manual. Cold Spring Harbor Lab.; Cold Spring Harbor, N.Y.

Since the present inventors have solved the problem of developing a suitable screening assay for use in an expression cloning technique to clone a phospholipase of the invention, see section with the heading "Protocol for cloning a filamentous fungal phospholipase", the DNA sequence of the invention can now be cloned by any general method involving cloning, in suitable vectors, a cDNA library from any organism expected to produce the phospholipase of interest, transforming suitable yeast host cells with said vectors, culturing the host cells under suitable conditions to express any enzyme of interest encoded by a clone in the cDNA library, screening for positive clones by determining any phospholipase activity of the enzyme produced by such clones, and isolating the enzyme encoding DNA from such clones.

Alternatively, since the present invention for the first time provides a cloned DNA sequence encoding a filamentous fungal PLA enzyme, the DNA encoding a phospholipase of the invention may, in accordance with well-known procedures, conveniently be cloned from a suitable source, such as any of the organisms mentioned in the section "Microbial Sources", by use of synthetic oligonucleotide probes prepared on the basis of a DNA sequence disclosed herein. For instance, a suitable oligonucleotide probe may be prepared on the basis of the phospholipase encoding part of the nucleotide sequences presented as SEQ ID No. 1 or any suitable subsequence thereof, or the basis of the amino acid sequence SEQ ID NO 2.

Further, since a cloned DNA sequence of the invention encodes a polypeptide having phospholipase activity according to the invention, a number of the specific embodiments relating to an isolated polypeptide having phospholipase activity of the invention are also embodiments of the invention for a cloned DNA sequence of the invention encoding a polypeptide having phospholipase activity. Consequently, references and preferred and most preferred embodiments of said isolated polypeptide having phospholipase activity also relate to a cloned DNA sequence of the invention.

Accordingly, an embodiment of the invention relates to a cloned DNA sequence according to the invention, wherein the phospholipase encoded by said DNA sequence is a phospholipase A1.

In a further embodiment, a cloned sequence according to the invention is a cloned DNA sequence, wherein the phospholipase encoded by said DNA sequence is a phospholipase A2, and in an even further embodiment a cloned sequence according to the invention is a cloned DNA sequence, wherein the phospholipase encoded by said DNA sequence is a phospholipase B.

Preferably, said cloned DNA sequence according to the invention encodes a polypeptide having phospholipase A1 activity.

Further, the invention relates to a cloned DNA sequence according to the invention, wherein the phospholipase encoded by said DNA sequence is a phospholipase which is substantially independent of $Ca^{2+}$ concentration measured as:

relative phospholipase activity at 5 mM EDTA and 5mM $Ca^{2+}$ in a phospholipase activity assay measuring release of free fatty acids from lecithin in a buffer comprising 2% lecithin, 2% Triton X-100, 20 mM citrate, pH 5; incubated for 10 min. at 37° C. followed by stop of reaction at 95° C. for 5 min.;

wherein the ratio of relative phospholipase activity at 5 mM EDTA/5 mM $Ca^{2+}$ is a ratio which is greater than 0.25, more preferably a ratio which is greater than 0.5.

Even further, the invention relates to a cloned DNA sequence according to the invention, wherein the phospholipase encoded by said DNA sequence is a phospholipase having a phospholipase activity which is at least 0.25 nmol/min, enzyme dose: 60 µg, at 25° C.; more preferably at least 0.40 nmol/min, enzyme dose: 60 µg, at 25° C.; measured in a monolayer phospholipase assay as follows:

a. in a monolayer equipment (zero-order through) on a thoroughly purified surface of a buffer solution (10 mM TRIS, pH 8.0, 25° C.) a monolayer of the phospholipid DDPC (Di Dicanoyl (C10) Phosphatidyl Choline) is spread from a chloroform solution;

b. after relaxation of the monolayer (evaporation of chloroform), the surface pressure is adjusted to 15 mN/m, corresponding to a mean molecular area of DDPC of approx. 63 $Å^2$/molecule;

c. an buffer solution (as above) containing 60 µg enzyme is injected through the monolayer into the subphase of the reaction compartment (cylinder with area 1520 $mm^2$ and volume 30400 $mm^3$) in the "zero-order trough";

d. enzymatic activity is determined through the speed of a mobile barrier compressing the monolayer in order to maintain constant surface pressure as insoluble substrate molecules are hydrolysed into more water soluble reaction products, where the number of DDPC-molecules hydrolyzed per minute by the enzyme is estimated from the mean molecular area (MMA) of DDPC.

In a further embodiment the invention relates to a cloned DNA sequence according to the invention, wherein the phospholipase encoded by said DNA sequence is a phospholipase having a phospholipase activity which is capable of releasing at least 7 µmol of free fatty acid/min./mg enzyme; more preferably at least 15 µmol of free fatty acid/min./mg enzyme; measured as follows:

phospholipase activity is measured in an assay measuring release of free fatty acids from lecithin in a buffer comprising 2% lecithin, 2% Triton X-100, 20 mM citrate, pH 5; incubated for 10 min. at 37° C. followed by stop of reaction at 95° C. for 5 min.

In further embodiments the invention relates to:

a cloned DNA sequence according to the invention, wherein the phospholipase encoded by said DNA sequence is capable of performing enzymatic degumming of an edible oil according to a method of the invention in order to reduce the amount of phosphorus containing components in an edible oil comprising a non-hydratable phosphorus content of at least 50 ppm; and a cloned DNA sequence according to the invention, wherein the phospholipase encoded by said DNA sequence is capable of performing an enzymatic degumming of a water-degummed edible oil (having a phosphorus content of 50–250 ppm) and thereby reducing the phosphorus content of the oil to less than 11 ppm, wherein the enzymatic degumming process comprises contacting said oil at a pH from 1.5–8 with an aqueous solution of the phospholipase which is emulsified in the oil until the phosphorus content of the oil is reduced to less than 11 ppm, and then separating the aqueous phase from the treated oil.

Preferably, a cloned DNA sequence according to the invention is a cloned DNA sequence, wherein the phospholipase encoded by said DNA sequence is capable of performing said enzymatic degumming process of the water-degummed edible oil by using less than 2 mg phospholipase (dry matter)/kg oil, and wherein the phospholipase is in contact with said oil for a time period of 15 minutes to 2 hours.

Protocol for cloning a filamentous fungal phospholipase

A number of technical difficulties were encountered when attemting to isolate a phospholipase of the invention or clone a polynucleotide coding for it. It seemed impossible to isolate the enzyme, and the problem of cloning the polynucleotide was pursued.

As described herein no prior DNA sequence encoding a filamentous fungal phospholipase A was available. Consequently, the present inventors developed a cloning strategy based on the expression cloning in yeast technique (H. Dalboege et al. Mol. Gen. Genet (1994) 243:253–260.; WO 93/11249; and WO 94/14953).

One of the major problems encountered with this technique was that yeast produces an internal activity giving rise to a phospholipase background on plate assays. This background was found to be highly dependent on the amount of substrate in the assay plates, and the amount of substrate thus had to be carefully titrated to a level where the background was low enough for the assay to be reliable during the expression cloning screening procedure, but high enough for the reaction to take place.

Furthermore, filamentous fungal strains in general comprise a number of different lipases, some of which even exhibit limited phospholipase activity. Such lipases are herein defined as "A lipase with phospholipase side activity" (see section "Definitions" herein).

In the plate assay, the background of such lipases with phospholipase side activity was found also to be highly dependent on the amount of substrate in the assay plates, and the amount of substrate thus had to be even more carefully titrated in order to eliminate the background activity from both the yeast cells and the filamentous fungal lipases with phospholipase side activity.

On top of this it was found that a carefull selection of the substrate had to be performed, since many did not provide any functional solution to this problem, since a number of the phospholipase substrates tested gave a background activity because lipases, without phospholipase activity, were able to react on the substrates. Accordingly, a high number of substrates had to be tested and titrated in order to identify a suitable substrate.

The solution found to make it possible to perform the expression cloning of a phospholipase coding polynucleotide was to use Lipoid E80 (from Lipoid GmbH) in carefully monitored concentrations. In the Materials and Method section herein a detailed description of the complete expression cloning in yeast protocol is disclosed, including a plate assay solving the above described problems.

Homology/identity of DNA sequences

The DNA sequence homology/identity referred to above is determined as the degree of identity between two sequences indicating a deviation of the first sequence from the second. The homology may suitably be determined by means of computer programs known in the art, such as GAP provided in the GCG program package (Program Manual for the Wisconsin Package, Version 8, August 1994, Genetics Computer Group, 575 Science Drive, Madison, Wis., USA 53711)(Needleman, S. B. and Wunsch, C. D., (1970), Journal of Molecular Biology, 48, 443–453). Using GAP with the following settings for DNA sequence comparison: GAP creation penalty of 5.0 and GAP extension penalty of 0.3, the coding region of the DNA sequence exhibits a degree of identity of preferably at least 70%, more preferably at least 80%, more preferably at least 90%, more preferably at least 95%, more preferably at least 97% with the phospholipase encoding part of the DNA sequence shown in SEQ ID No. 1 (i.e. position 23–1063 in SEQ ID NO 1); or more preferred with the DNA sequence shown in position 113–1063 in SEQ ID NO 1 (pos. 113 corresponds to the N-terminal residue of the mature enzyme); or even more preferred with the DNA sequence shown in position 23–929 in SEQ ID NO 1 (pos. 929 corresponds to the C-terminal residue in C-terminal processed secreted active enzyme).

Hybridization

The hybridization referred to above is intended to comprise an analogous DNA sequence which hybridizes to a double-stranded DNA probe corresponding to the phospholipase encoding part of the DNA sequence shown in SEQ ID NO 1, i.e. nucleotides 23–1063, or more preferred with a double-stranded DNA probe corresponding to the DNA sequence shown in position 113–1063 in SEQ ID NO 1 (pos. 113 corresponds to the N-terminal residue of the mature enzyme); or even more preferred with a double-stranded DNA probe corresponding to the DNA sequence shown in position 23–929 in SEQ ID NO 1 (pos. 929 corresponds to the C-terminal residue in the C-terminal processed secreted active enzyme), under at least low stringency conditions as described in detail below.

Suitable experimental conditions for determining hybridization at low, medium, or high stringency between a nucleotide probe and a homologous DNA or RNA sequence involve presoaking of the filter containing the DNA fragments or RNA to hybridize in 5× SSC (Sodium chloride/Sodium citrate, Sambrook et al. 1989) for 10 min, and prehybridization of the filter in a solution of 5× SSC, 5× Denhardt's solution (Sambrook et al. 1989), 0.5% SDS and 100 $\mu$g/ml of denatured sonicated salmon sperm DNA (Sambrook et al. 1989), followed by hybridization in the same solution containing 10 ng/ml of a random-primed (Feinberg, A. P. and Vogelstein, B. (1983) Anal. Biochem. 132:6–13), $^{32}$P-dCTP-labeled (specific activity >1×10$^9$ cpm/$\mu$g) probe for 12 hours at ca. 45° C. The filter is then washed twice for 30 minutes in 2× SSC, 0.5% SDS at a temperature of at least 55° C. (low stringency), more preferably at least 60° C. (medium stringency), still more preferably at least 65° C. (medium/high stringency), even more preferably at least 70° C. (high stringency), even more preferably at least 75° C. (very high stringency).

Molecules to which the oligonucleotide probe hybridizes under these conditions are detected using an X-ray film.

It has been found that it is possible to theoretically predict whether or not two given DNA sequences will hybridize under certain specified conditions.

Accordingly, as an alternative to the above described experimental method the determination of whether or not an analogous DNA sequence will hybridize to the nucleotide probe described above can be based on a theoretical calculation of the Tm (melting temperature) at which two heterologous DNA sequences with known sequences will hybridize under specified conditions (e.g. with respect to cation concentration and temperature).

In order to determine the melting temperature for heterologous DNA sequences (Tm(hetero)) it is necessary to initially determine the melting temperature (Tm(homo)) for homologous DNA sequences.

The melting temperature (Tm(homo) between two fully complementary DNA strands (homoduplex formation) may be determined by use of the following formula:

Tm(homo)=81.5° C.+16.6(log M)+0.41(%GC)−0.61(% form)−500/L ("Current protocols in Molecular Biology". John Wiley and Sons, 1995), wherein "M" denotes the molar cation concentration in wash buffer, "%GC" % Guanine (G) and Cytosine (C) of the total number of bases in the DNA sequence, "% form" % formamid in the wash buffer, and "L" the length of the DNA sequence.

Using this formula and the experimental wash conditions given above, Tm(homo) for the homoduplex formation of the nucleotide probe corresponding to the DNA sequence shown in SEQ ID NO 1, i.e. nucleotides 23–1060 is:

Tm(homo)=81.5+16.6(log 0.30)+0.41(56)−0.61(0)−(500/1038)

Tm(homo)=103.5° C.

"M"; 2× SSC corresponds to a cation conc. of 0.3M.

"%GC" The %GC in SEQ ID No 1 pos. 23–1060 is 56%

"% form": There is no formamid in the wash buffer.

"L": The length of SEQ ID No 1 SEQ ID No 1 pos. 23–1063 1038 bp.

The Tm determined by the above formula is the Tm of a homoduplex formation (Tm(homo)) between two fully complementary DNA sequences. In order to adapt the Tm value to that of two heterologous DNA sequences, it is assumed that a 1% difference in nucleotide sequence between the two heterologous sequences equals a 1° C. decrease in Tm ("Current protocols in Molecular Biology". John Wiley and Sons, 1995). Therefore, the Tm(hetero) for the heteroduplex formation is found by subtracting the homology % difference between the analogous sequence in question and the nucleotide probe described above from the Tm(homo). The DNA homology percentage to be subtracted is calculated as described herein (vide supra).

Homology to amino acid sequences

The polypeptide homology referred to above is determined as the degree of identity between two sequences indicating a deviation of the first sequence from the second. The homology may suitably be determined by means of computer programs known in the art such as GAP provided in the GCG program package (Program Manual for the Wisconsin Package, Version 8, August 1994, Genetics Computer Group, 575 Science Drive, Madison, Wis., USA 53711) (Needleman, S. B. and Wunsch, C. D., (1970), Journal of Molecular Biology, 48, 443–453. Using GAP with the following settings for polypeptide sequence comparison: GAP creation penalty of 3.0 and GAP extension penalty of 0.1, the mature part of a polypeptide encoded by an analogous DNA sequence exhibits a degree of identity preferably of at least 70%, more preferably at least 80%, more preferably at least 90%, more preferably at least 95%, especially at least 97% with the mature part of the amino acid sequence shown in SEQ ID NO 2, i.e. position 31–346 in SEQ ID NO 2, or more preferred with the amino acid sequence shown in position 31–303 of SEQ ID NO 2 (pos. 303 is the C-terminal residue in C-terminal processed secreted active enzyme).

The present invention is also directed to phospholipase variants with an amino acid sequence which differs by not more than three amino acids, preferably by not more than two amino acids, and more preferably by not more than one amino acid from the mature part of the amino acid sequence set forth in SEQ ID NO 2.

Further, the above mentioned preferred amino acid identities also relate to an analogue of a cloned DNA sequence of the invention, which sequence encodes a polypeptide exhibiting phospholipase activity, and which is at least 70% homologous with the polypeptide sequence shown in positions 31-346 of SEQ ID No 2, or more preferably at least 70% homologous with the polypeptide sequence comprising positions 31–303 of SEQ ID No 2.

Immunological cross-reactivity

Antibodies to be used in determining immunological cross-reactivity may be prepared by using a purified phospholipase. More specifically, antiserum against the phospholipase of the invention may be raised by immunizing rabbits (or other rodents) according to the procedure described by N. Axelsen et al. in A Manual of Quantitative Immunoelectrophoresis, Blackwell Scientific Publications, 1973, Chapter 23, or A. Johnstone and R. Thorpe, Immunochemistry in Practice, Blackwell Scientific Publications, 1982 (more specifically p. 27–31). Purified immunoglobulins may be obtained from the antiserum obtained, for example by salt precipitation (($NH_4)_2$ $SO_4$), followed by dialysis and ion exchange chromatography, e.g. on DEAE-Sephadex. Immunochemical characterization of proteins may be performed either by Outcherlony double-diffusion analysis (O. Ouchterlony in: Handbook of Experimental Immunology (D. M. Weir, Ed.), Blackwell Scientific Publications, 1967, pp. 655–706), by crossed immunoelectrophoresis (N. Axelsen et al., supra, Chapters 3 and 4), or by rocket immunoelectrophoresis (N. Axelsen et al., Chapter 2).

Microbial Sources

At the priority date of the present invention, the taxonomy applied below is in accordance with the World Wide Web (WWW) NCBI taxonomy browser.

An isolated polypeptide having phospholipase activity and the corresponding cloned DNA sequence of the invention may be obtained from any microorganism, preferably a filamentous fungus, a yeast cell, or a bacterium.

Preferably, a phospholipase and the corresponding cloned DNA sequence of the invention may be obtained from a filamentous fungal strain, wherein a preferred phylum is Ascomycota, wherein a preferred class is Pyrenomycetes comprising the preferred family Nectriaceae.

More preferably, the phospholipase and the corresponding cloned DNA sequence of the invention may be obtained from a strain of the genus Fusarium, such as a strain of *F. culmorum, F. heterosporum*, or *F. solani*, in particular a strain of *Fusarium oxysporum*.

Further, a phospholipase and the corresponding cloned DNA sequence of the invention may be obtained from a filamentous fungal strain within the genus Aspergillus, such as a strain of *Aspergillus awamori, Aspergillus foetidus, Aspergillus japonicus, Aspergillus niger* or in particular *Aspergillus oryzae*.

An isolate of a strain of *Fusarium oxysporum* from which a phospholipase of the invention can be obtained has been deposited according to the Budapest Treaty on the International Recognition of the Deposit of Microorganisms for the Purposes of Patent Procedure at the Deutche Sammlung von Mikroorganismen und Zellkulturen GmbH., Mascheroder Weg 1b, D-38124 Braunschweig, Federal Republic of Germany, (DSM).

Deposit date: Jun. 6, 1983
Depositor's ref.: NN041759
DSM No.: *Fusarium oxysporum* DSM No. 2672

Further, the expression plasmid pYES 2.0 comprising the full length cDNA sequence encoding the phospholipase of the invention has been transformed into a strain of the *Escherichia coli* which was deposited according to the Budapest Treaty on the is International Recognition of the Deposit of Microorganisms for the Purposes of Patent Procedure at the Deutche Sammlung von Mikroorganismen und Zellkulturen GmbH, Mascheroder Weg 1b, D-38124 Braunschweig, Federal Republic of Germany, (DSM).

Deposit date: Nov. 25, 1996
Depositor's ref.: NN049279
DSM No.: *Escherichia coli* DSM No. 11299

Expression vectors

The expression vector of the invention may be any expression vector that is conveniently subjected to recombinant DNA procedures, and the choice of vector will often depend on the host cell into which the vector it is to be introduced. Thus, the vector may be an autonomously replicating vector, i.e. a vector which exists as an extrachromosomal entity, the replication of which is independent of chromosomal replication, e.g. a plasmid. Alternatively, the vector may be one which, when introduced into a host cell, is integrated into the host cell genome and replicated together with the chromosome(s) into which it has been integrated.

In the expression vector, the DNA sequence encoding the phospholipase should be operably connected to a suitable promoter and terminator sequence. The promoter may be any DNA sequence which shows transcriptional activity in the host cell of choice and may be derived from genes encoding proteins which are either homologous or heterologous to the host cell. The procedures used to ligate the DNA sequences coding for the phospholipase, the promoter and the terminator and to insert them into suitable vectors are well known to persons skilled in the art (cf. e.g. Sambrook et al., (1989), Molecular Cloning. A Laboratory Manual, Cold Spring Harbor, N.Y.).

Examples of suitable promoters for use in filamentous fungus host cells are, e.g. the ADH3 promoter (McKnight et al., *The EMBO J.* 4 (1985), 2093–2099) or the tpiA promoter. Examples of other useful promoters are those derived from the gene encoding *Aspergillus oryzae* TAKA amylase, *Rhizomucor miehei* aspartic proteinase, *Aspergillus niger* neutral α-amylase, *Aspergillus niger* acid stable α-amylase, *Aspergillus niger* or *Aspergillus awamori* glucoamylase (gluA), *Rhizomucor miehei* lipase, *Aspergillus oryzae* alkaline protease, *Aspergillus oryzae* triose phosphate isomerase or *Aspergillus nidulans* acetamidase.

Host Cells

The present invention also relates to recombinant host cells comprising a nucleic acid sequence of the invention, which cells may advantageously be used in the recombinant production of the polypeptides. The term "host cell" encompasses any progeny of a parent cell which is not identical to the parent cell due to mutations that occur during replication.

The cell is preferably transformed with a vector comprising a nucleic acid sequence of the invention followed by integration of the vector into the host chromosome.

"Transformation" means introducing a vector comprising a nucleic acid sequence of the present invention into a host cell so that the vector is maintained as a chromosomal integrant or as a self-replicating extra-chromosomal vector. Integration is generally considered to be an advantage as the nucleic acid sequence is more likely to be stably maintained in the cell. Integration of the vector into the host chromosome may occur by homologous or non-homologous recombination as described above.

In a preferred embodiment, the host cell is a fungal cell. "Fungi" as used herein includes the phyla Ascomycota, Basidiomycota, Chytridiomycota, and Zygomycota (as defined by Hawksworth et al., In, Ainsworth and Bisby's Dictionary of The Fungi, 8th edition, 1995, CAB International, University Press, Cambridge, UK) as well as the Oomycota (as cited in Hawksworth et al., 1995, supra, page 171) and all mitosporic fungi (Hawksworth et al., 1995, supra). Representative groups of Ascomycota include, e.g., Neurospora, Eupenicillium (=Penicillium), Emericella (=Aspergillus), Eurotium (=Aspergillus), and the true yeasts listed above. Examples of Basidiomycota include mushrooms, rusts, and smuts. Representative groups of Chytridiomycota include, e.g., Allomyces, Blastocladiella, Coelomomyces, and aquatic fungi. Representative groups of Oomycota include, e.g., saprolegniomycetous aquatic fungi (water molds) such as Achlya. Examples of mitosporic fungi include Aspergillus, Penicillium, Candida, and Alternaria. Representative groups of Zygomycota include, e.g., Rhizopus and Mucor.

In a preferred embodiment, the fungal host cell is a filamentous fungal cell. "Filamentous fungi" includes all filamentous forms of the subdivision Eumycota and Oomycota (as defined by Hawksworth et al., 1995, supra). The filamentous fungi are characterized by a vegetative mycelium composed of chitin, cellulose, glucan, chitosan, mannan, and other complex polysaccharides. Vegetative growth is by hyphal elongation and carbon catabolism is obligately aerobic. In contrast, vegetative growth by yeasts such as *Saccharomyces cerevisiae* is by budding of a unicellular thallus and carbon catabolism may be fermentative. In a more preferred embodiment, the filamentous fungal host cell is a cell of a species of, but not limited to, Acremonium, Aspergillus, Fusarium, Humicola, Mucor, Myceliophthora, Neurospora, Penicillium, Thielavia, Tolypocladium, and Trichoderma or a teleomorph or synonym thereof. In an even more preferred embodiment, the filamentous fungal host cell is an Aspergillus cell. In another still more preferred embodiment, the filamentous fungal host cell is an Acremonium cell. In another even more preferred embodiment, the filamentous fungal host cell is a Fusarium cell. In another even more preferred embodiment, the filamentous fungal host cell is a Humicola cell. In another even more preferred embodiment, the filamentous fungal host cell is a Mucor cell. In another even more preferred embodiment, the filamentous fungal host cell is a Myceliophthora cell. In another even more preferred embodiment, the filamentous fungal host cell is a Neurospora cell. In another even more preferred embodiment, the filamentous fungal host cell is a Penicillium cell. In another even more preferred embodiment, the filamentous fungal host cell is a Thielavia cell. In another even more preferred embodiment, the filamentous fungal host cell is a Tolypocladium cell. In another even more preferred embodiment, the filamentous fungal host cell is a Trichoderma cell. In a most preferred embodiment, the filamentous fungal host cell is an *Aspergillus awamori, Aspergillus foetidus, Aspergillus japonicus, Aspergillus niger* or *Aspergillus oryzae* cell. In another most preferred embodiment, the filamentous fungal host cell is a Fusarium cell of the section Discolor (also known as the section Fusarium). In another preferred embodiment, the filamentous fungal parent cell is a Fusarium strain of the section Elegans, e.g., *Fusarium oxysporum*. In another most preferred embodiment, the filamentous fungal host cell is a *Humicola insolens* or *Thermomyces lanuginosa* cell. In another most preferred embodiment, the filamentous fungal host cell is a *Rhizomucor miehei* cell. In another most preferred embodiment, the filamentous fungal host cell is a *Myceliophthora thermophilum* cell. In another most preferred embodiment, the filamentous fungal host cell is a *Neurospora crassa* cell. In another most preferred embodiment, the filamentous fungal host cell is a *Penicillium purpurogenum* cell. In another most preferred embodiment, the filamentous fungal host cell is a *Thielavia terrestris* cell. In another most preferred embodiment, the Trichoderma cell is a *Trichoderma harzianum, Trichoderma koningii, Trichoderma longibrachiatum, Trichoderma reesei* or *Trichoderma viride* cell.

Fungal cells may be transformed by a process involving protoplast formation, transformation of the protoplasts, and regeneration of the cell wall in a manner known per se. Suitable procedures for transformation of Aspergillus host cells are described in EP 238 023 and Yelton et al., 1984, Proceedings of the National Academy of Sciences USA 81:1470–1474. A suitable method of transforming Fusarium species is described by Malardier et al., 1989, Gene 78:147–156 or in copending U.S. Ser. No. 08/269,449. Yeast may be transformed using the procedures described by Becker and Guarente, In Abelson, J. N. and Simon, M. I., editors, *Guide to Yeast Genetics and Molecular Biology*, Methods in Enzymology, Volume 194, pp 182–187, Academic Press, Inc., New York; Ito et al., 1983, *Journal of Bacteriology* 153:163; and Hinnen et al., 1978, *Proceedings of the National Academy of Sciences USA* 75:1920. Mammalian cells may be transformed by direct uptake using the calcium phosphate precipitation method of Graham and Van der Eb (1978, Virology 52:546).

Method of producing phospholipase

The present invention provides a method of producing an isolated enzyme according to the invention, wherein a suitable host cell, which has been transformed with a DNA sequence encoding the enzyme, is cultured under conditions permitting the production of the enzyme, and the resulting enzyme is recovered from the culture.

When an expression vector comprising a DNA sequence encoding the enzyme is transformed into a heterologous host cell, it is possible to enable heterologous recombinant production of the enzyme of the invention.

Thereby it is possible to obtain a highly purified phospholipase composition, characterized in being-free from homologous impurities.

In the present invention the homologous host cell may be a strain of *Fusarium oxysporum*.

The medium used to culture the transformed host cells may be any conventional medium suitable for growing the host cells in question. The expressed phospholipase may conveniently be secreted into the culture medium and may be recovered therefrom by well-known procedures including separating the cells from the medium by centrifugation or filtration, precipitating proteinaceous components of the medium by means of a salt such as ammonium sulphate, followed by chromatographic procedures such as ion exchange chromatography, affinity chromatography, or the like.

Use of phospholipase

Beside the use of a phospholipase in a new method of the invention for enzymatic degumming of an edible oil comprising a high amount of non-hydratable phosphorus, a number of other uses of phospholipases are known in the art.

Such in the art known uses/applications of phospholipases are described below.

The phospholipase of the invention can be used in any application where it is desired to hydrolyze the fatty acyl group(s) of a phospholipid or lyso-phospholipid, such as lecithin or lyso-lecithin. The phospholipase is preferably used at pH 3–10 and at 30–70° C. (particularly 40–60° C.). If desired, the phospholipase may be inactivated after the reaction by subjecting it to heat treatment, e.g. at pH 7, 80° C. for 1 hour or 90° C. for 10 minutes.

As an example, the phospholipase of the invention can be used in the preparation of dough, bread and cakes, e.g. to improve the elasticity of the bread or cake. Thus, the phospholipase can be used in a process for making bread, comprising adding the phospholipase to the ingredients of a dough, kneading the dough and baking the dough to make the bread. This can be done in analogy with U.S. Pat. No. 4,567,046 (Kyowa Hakko), JP-A 60-78529 (QP Corp.), JP-A 62-111629 (QP Corp.), JP-A 63-258528 (QP Corp.) or EP 426211 (Unilever).

The phospholipase of the invention can also be used to improve the filterability of an aqueous solution or slurry of carbohydrate origin by treating it with the phospholipase. This is particularly applicable to a solution or slurry containing a starch hydrolysate, especially a wheat starch hydrolysate, since this tends to be difficult to filter and to give cloudy filtrates. The treatment can be done in analogy with EP 219,269 (CPC International).

Further, a phospholipase of the invention may be used for partial hydrolysis of phospholipids, preferably Lecithin, to obtain improved phospholipid emulsifiers. This application is further described in product sheets for Lecitase™ (Novo Nordisk A/S) relating to this use, and in Ullmann's Encyclopedia of Industrial Chemistry (Publisher: VCH Weinheim (1996)).

Further, a phospholipase of the invention may be used in a process for the production of an animal feed which comprises mixing the phospholipase with feed substances and at least one phospholipid. This can be done in analogy with EP 743 017.

Degumming of vegetable/edible oils according to procedures known in the art

According to procedures known in the art the phospholipase of the invention can be used in a process for reducing the content of phospholipid in an edible oil, comprising treating the oil with the phospholipase so as to hydrolyze a major part of the phospholipid, and separating an aqueous phase containing the hydrolyzed phospholipid from the oil. This process is applicable to the purification of any edible oil which contains phospholipid, e.g. vegetable oil such as soy bean oil, rape seed oil and sunflower oil.

Prior to the enzymatic treatment, the vegetable oil is preferably pretreated to remove slime (mucilage), e.g. by wet refining. Typically, the oil will contain 50–250 ppm of phosphorus as phospholipid at the start of the treatment with phospholipase, and the process of the invention can reduce this value to below 11 ppm, more preferably below 5 ppm.

The enzymatic treatment is conducted by dispersing an aqueous solution of the phospholipase, preferably as droplets with an average diameter below 10 $\mu$(micro)m. The amount of water is preferably 0.5–5% by weight in relation to the oil. An emulsifier may optionally be added. Mechanical agitation may be applied to maintain the emulsion.

The enzymatic treatment can be conducted at any pH in the range 1.5–8. The pH may be adjusted by adding citric acid, a citrate buffer or HCl.

A suitable temperature is generally 30–70° C. (particularly 40–60° C.). The reaction time will typically be 0.5–12 hours (e.g. 2–6 hours), and a suitable enzyme dosage will usually be 100–5000 IU per liter of oil, particularly 200–2000 IU/l.

The enzymatic treatment may be conducted batchwise, e.g. in a tank with stirring, or it may be continuous, e.g. a series of stirred tank reactors.

The enzymatic treatment is followed by separation of an aqueous phase and an oil phase. This separation may be performed by conventional means, e.g. centrifugation.

In other respects, the process can be conducted according to principles known in the art, e.g. in analogy with U.S. Pat. No. 5,264,367 (Metallgesellschaft, Röhm); K. Dahlke & H. Buchold, INFORM, 6 (12), 1284–91 (1995); H. Buchold, Fat Sci. Technol., 95 (8), 300–304 (1993); JP-A 2-153997 (Showa Sangyo); or EP 654,527 (Metallgesellschaft, Röhm).

Use of a phospholipase of the invention in baking

The phospholipase of the invention also may be used in bread-improving additives, e.g. dough compositions, dough additives, dough conditioners, pre-mixes, and similar preparations conventionally added to the flour and/or the dough during processes for making bread or other baked products to provide improved properties of bread or other baked products.

Therefore, an embodiment of the invention relates to a bread-improving and/or a dough-improving composition, and further, to the use of a phospholipase of the invention in such compositions, and to a dough or baked product comprising a bread-improving and/or a dough-improving composition of the invention.

In the present context the terms "bread-improving composition" and "dough-improving composition" are intended to indicate compositions which, in addition to the enzyme component, may comprise other substances conventionally used in baking to improve the properties of dough and/or baked products. Examples of such components are given below.

In the present context the term "improved properties" is intended to indicate any property which may be improved by the action of a phospholipase enzyme of the invention. In particular, the use of phospholipase results in an increased volume and an improved crumb structure and anti-staling properties of the baked product, as well as an increased strength, stability and reduced stickiness and thereby improved machinability of the dough. The effect on the dough has been found to be particularly good when a poor quality flour has been used. The improved machinability is of particular importance in connection with dough which is to be processed industrially.

The improved properties are evaluated by comparison with dough and/or baked products prepared without addition of phospholipase in accordance with the present invention.

The bread- and/or dough-improving composition of the invention may further comprise another enzyme. Examples of other enzymes are a cellulase, a hemicellulase, a pentosanase (useful for the partial hydrolysis of pentosans which increases the extensibility of the dough), a glucose oxidase (useful for strengthening the dough), a lipase (useful for the modification of lipids present in the dough or dough constituents so as to soften the dough), a peroxidase (useful for improving the dough consistency), a protease (useful for gluten weakening, in particular when using hard wheat flour), a peptidase and/or an amylase, e.g. α-amylase (useful for providing sugars fermentable by yeast).

In addition or as an alternative to other enzyme components, the dough-improving and/or bread-improving composition may comprise a conventionally used baking agent, e.g. one or more of the following constituents:

A milk powder (providing crust colour), gluten (to improve the gas retention power of weak flours), an emulsifier (to improve dough extensibility and to some extent the consistency of the resulting bread), granulated fat (for dough softening and consistency of bread), an oxidant (added to strengthen the gluten structure; e.g. ascorbic acid, potassium bromate, potassium iodate or ammonium persulfate), an amino acid (e.g. cysteine), a sugar, and salt (e.g. sodium chloride, calcium acetate, sodium sulfate or calcium sulfate serving to make the dough firmer), flour or starch.

Examples of suitable emulsifiers are mono- or diglycerides, diacetyl tartaric acid esters of mono- or diglycerides, sugar esters of fatty acids, polyglycerol esters of fatty acids, lactic acid esters of monoglycerides, acetic acid esters of monoglycerides, polyoxyethylene stearates, phospholipids and lecithin.

In the present context the term "baked product" is intended to include any product prepared from dough, either of a soft or a crisp character. Examples of baked products, whether of a white, light or dark type, which may advantageously be produced by the present invention are bread (in particular white, whole-meal or rye bread), typically in the form of loaves or rolls, French baguette-type bread, pita bread, tacos, cakes, pan-cakes, biscuits, crisp bread and the like.

The dough of the invention may be of any of the types discussed above, and may be fresh or frozen.

From the above disclosure it will be apparent that the dough of the invention is normally a leavened dough or a dough to be subjected to leavening. The dough may be leavened in various ways such as by adding sodium bicarbonate or the like or by adding a leaven (fermenting dough), but it is preferred to leaven the dough by adding a suitable yeast culture such as a culture of *Saccharomyces cerevisiae* (baker's yeast). Any of the commercially available *S. cereviciae* strains may be employed.

In a final embodiment the invention relates to the use of a phospholipase of the invention for the preparation of pasta dough, preferably prepared from durum flour or a flour of comparable quality. The dough may be prepared by use of conventional techniques and the phospholipase used in a similar dosage as that described above. The phospholipase is preferably of microbial origin, e.g. as disclosed herein. It is contemplated that when used in the preparation of pasta the phospholipase results in a strengthening of the gluten structure and thus a reduction in the dough stickiness and an increased dough strength.

Use of lipase activity of an enzyme of the invention

As shown in working examples herein a phospholipase of the invention may further exhibit lipase activity.

Accordingly the invention further relates to use of this lipase activity in standard uses of a lipase, in particular for use in cleaning and detergent compositions. Such cleaning and detergent compositions are well described in the art and reference is made to WO 96/34946; WO 97/07202; and WO 95/30011 for further description of suitable cleaning and detergent compositions.

The invention is described in further detail in the following examples which are not in any way intended to limit the scope of the invention as claimed.

MATERIALS AND METHODS

Deposited organisms:

*Fusarium oxysporum* DSM No. 2672 comprises the phospholipase encoding DNA sequence of the invention.

*Escherichia coli* DSM 11299 containing the plasmid comprising the full length cDNA sequence, coding for the phospholipase of the invention, in the shuttle vector pYES 2.0.

Other strains:

Yeast strain: The *Saccharomyces cerevisiae* strain used was W3124 (MATa; ura 3-52; leu 2-3, 112; his 3-D200; pep 4-1137; prcl::HIS3; prbl:: LEU2; cir+).

*E. coli* strain: DH10B (Life Technologies)

Plasmids:

The Aspergillus expression vector pHD414 is a derivative of the plasmid p775 (described in EP 238 023). The construction of pHD414 is further described in WO 93/11249.

pYES 2.0 (Invitrogen)

pA2PH10 (See example 7) ps General molecular biology methods

Unless otherwise mentioned the DNA manipulations and transformations were performed using standard methods of molecular biology (Sambrook et al. (1989) Molecular cloning: A laboratory manual, Cold Spring Harbor lab., Cold Spring Harbor, N.Y.; Ausubel, F. M. et al. (eds.) "Current protocols in Molecular Biology". John Wiley and Sons, 1995; Harwood, C. R., and Cutting, S. M. (eds.) "Molecular Biological Methods for Bacillus". John Wiley and Sons, 1990).

Enzymes for DNA manipulations were used according to the specifications of the suppliers.

Enzymes for DNA manipulations

Unless otherwise mentioned all enzymes for DNA manipulations, such as e.g. restriction endonucleases, ligases etc., are obtained from New England Biolabs, Inc.

Phospholipase Activity Assay based on NEFA-C test:

Substrate: L-α-lysophosphatidylcholine (Sigma).

Substrate: Soybean Lecithin (Sigma #P3644). Used to measure phospholipase A activity.

Nefa-C test kit is from Wako Chemicals Germany.

Buffer: 20 mM NaOAc pH 4.5

Substrate solution: 10 mg substrate in 1 mL milli Q water and 1 mL buffer (make enough substrate solution to all samples)

1. 15 μl enzyme is added to 150 μl substrate solution
2. Incubation for 10 min. at 40° C.
3. 30 μl is transferred to 300 μl reagent 1 (from Nefa kit)
4. Incubation for 10 min. at 37° C.
5. Addition of 600 μl reagent 2 (from Nefa-kit)
6. Incubation for 10 min. at 37° C.
7. Absorption of final reaction product is measured at 550 nm, according to Nefa-kit instructions.

The enzyme activity required to produce 1 μmol of fatty acid per minute of the enzyme reaction was defined as 1 unit.

Expression cloning in yeast

Expression cloning in yeast was done as comprehensively described by H. Dalboege et al. (H. Dalboege et al Mol. Gen. Genet (1994) 243:253–260.; WO 93/11249; WO 94/14953), which are hereby incorporated by reference.

All individual steps of Extraction of total RNA, cDNA synthesis, mung bean nuclease treatment, blunt-ending with T4 DNA polymerase, and Construction of libraries was done according to the references mentioned above.

Fermentation procedure of *Fusarium oxysporum* DSM No. 2672 for mRNA isolation:

*Fusarium oxysporum* DSM No. 2672 was cultivated in YPD medium for 4 days at 30° C. 10 μl Supernatant was tested for phospholipase activity in the plate assay described below.

mRNA was isolated from mycelium from this culture as described in H. Dalboege et al Mol. Gen. Genet (1994) 243:253–260.; WO 93/11249; and WO 94/14953.

Identification of positive yeast clones (plate assay):

Identification of positive yeast clones (i.e. clones which comprise a gene encoding for phospholipase activity) was done as described below.

The yeast transformants are plated on SC agar containing 2% glucose and incubated for 3 days at 30° C. A cellulose acetate filter (OE67, Schleicher & Schuell) is placed on top of the cells and then transferred to the plates containing SC agar and 2% galactose with the cells on top of the filter. After 3 days of incubation at 30° C. the filter with cells is transferred to substrate plates. Positive clones are identified as colonies giving rise to a blue-green zone in the substrate plate under the colony.

The substrate plates are made the following way: 2.5 g agar (BA-30 INA Agar®, Funakoshi Co. Ltd.) is added to 137.5 ml of $H_2O$, heated to boiling in a microwave oven. After cooling to about 60° C., 30 ml of the following mixture is added: 62.5 ml 0.4 M Tris-HCl buffer (pH 7.5) and 50 ml 3% Lipoid E80 (Lipoid GmbH, D-67065 Ludwigshafen, Germany) dissolved in 2% Triton X-100 (v/v) and 0.5 ml 2% Brilliant Green solution in $H_2O$. The concentration of the substrate is important. If the concentration is to high it can give rise to background activity from the yeast cells and/or from filamentous fungal lipases with phospholipase side activity.

Isolation of a cDNA gene for expression in Aspergillus:

A phospholipase-producing yeast colony is inoculated into 20 ml YPD broth in a 50 ml glass test tube. The tube is shaken for 2 days at 30° C. The cells are harvested by centrifugation for 10 min. at 3000 rpm.

DNA is isolated according to WO 94/14953 and dissolved in 50 ml water. The DNA is transformed into *E. coli* by standard procedures. Plasmid DNA is isolated from *E. coli* using standard procedures, and analyzed by restriction enzyme analysis. The cDNA insert is excised using appropriate restriction enzymes and ligated into an Aspergillus expression vector.

Transformation of *Aspergillus oryzae* or *Aspergillus niger*

Protoplasts may be prepared as described in WO 95/02043, p. 16, line 21—page 17, line 12, which is hereby incorporated by reference.

100 μl of protoplast suspension is mixed with 5–25 μg of the appropriate DNA in 10 μl of STC (1.2 M sorbitol, 10 mM Tris-HCl, pH=7.5, 10 mM $CaCl_2$). Protoplasts are mixed with p3SR2 (an *A. nidulans* amdS gene carrying plasmid). The mixture is left at room temperature for 25 minutes. 0.2 ml of 60% PEG 4000 (BDH 29576), 10 mM $CaCl_2$ and 10 mM Tris-HCl, pH 7.5 is added and carefully mixed (twice) and finally 0.85 ml of the same solution is added and carefully mixed. The mixture is left at room temperature for 25 minutes, spun at 2500 g for 15 minutes and the pellet is resuspended in 2 ml of 1.2 M sorbitol. After one more sedimentation the protoplasts are spread on minimal plates (Cove, Biochem. Biophys. Acta 113 (1966) 51–56) containing 1.0 M sucrose, pH 7.0, 10 mM acetamide as nitrogen source and 20 mM CsCl to inhibit background growth. After incubation for 4–7 days at 37° C. spores are picked and spread for single colonies. This procedure is repeated and spores of a single colony after the second reisolation are stored as a defined transformant.

Test of *A. oryzae* or *Aspergillus niger* transformants

Each of the *A. oryzae* transformants are inoculated in 10 ml of YPM (cf. below) and propagated. After 2–5 days of incubation at 30° C., the supernatant is removed. 20 μl of supernatant is loaded into holes punched in a substrate plate (vide supra). After 1–24 hours, phospholipase activity appears as a blue-green zone around the hole.

Fed batch fermentation

Fed batch fermentation was performed in a medium comprising maltodextrin as a carbon source, urea as a nitrogen source and yeast extract. The fed batch fermentation was performed by inoculating a shake flask culture of *A. oryzae* host cells in question into a medium comprising 3.5% of the carbon source and 0.5% of the nitrogen source. After 24 hours of cultivation at pH 7.0 and 34° C. the continuous supply of additional carbon and nitrogen sources was initiated. The carbon source was kept as the limiting factor and it was ensured that oxygen was present in excessive amounts. The fed batch cultivation was continued for 4 days.

Isolation of the DNA sequence shown in SEQ ID No. 1

The phospholipase encoding part of the DNA sequence shown in SEQ ID No. 1 coding for the phospholipase of the invention can be obtained from the deposited organism *Escherichia coli* DSM 11299 by extraction of plasmid DNA by methods known in the art (Sambrook et al. (1989) Molecular cloning: A laboratory manual, Cold Spring Harbor lab., Cold Spring Harbor, N.Y.).

Media

YPD: 10 g yeast extract, 20 g peptone, $H_2O$ to 900 ml. Autoclaved, 100 ml 20% glucose (sterile filtered) added.

YPM: 10 g yeast extract, 20 g peptone, $H_2O$ to 900 ml. Autoclaved, 100 ml 20% maltodextrin (sterile filtered) added.

10× Basal salt: 75 g yeast nitrogen base, 113 g succinic acid, 68 g NaOH, $H_2O$ ad 1000 ml, sterile filtered.

SC-URA: 100 ml 10× Basal salt, 28 ml 20% casamino acids without vitamins, 10 ml 1% tryptophan, $H_2O$ ad 900 ml, autoclaved, 3.6 ml 5% threonine and 100 ml 20% glucose or 20% galactose added.

SC-agar: SC-URA, 20 g/l agar added.

SC-variant agar: 20 g agar, 20 ml 10× Basal salt, $H_2O$ ad 900 ml, autoclaved

PEG 4000 (polyethylene glycol, molecular weight=4,000) (BDH, England)

EXAMPLES

Example 1

Fermentation of *Fusarium oxysporum* phospholipase

A culture of *Fusarium oxysporum*, DSM 2672, on an agar slant was transferred to five 500 ml shaking flasks, each with 100 ml of Bouillon-3 medium, and shaken at 30° C. for 1 day (200 rpm, amplitude 2.5 cm).

The composition of Bouillon-3 medium was as follows:

| | |
|---|---|
| Peptone | 6 g/l |
| Trypsin digested casein | 4 g/l |
| Yeast extract | 3 g/l |
| Meat extract | 1.5 g/l |
| Glucose | 1 g/l |

The medium was autoclaved at 121° C. for 40 minutes.

The culture broth of these Bullion-3 shake flasks was used as a seed culture for inoculating twenty 500 ml shake flasks, each with 200 ml PL-1 medium.

The composition of the PL-1 medium was as follows:

| | |
|---|---|
| Peptone | 10 g/l |
| Tween ®-80 | 12 g/l |
| $MgSO_4$; $7H_2O$ | 2 g/l |
| $CaCl_2$; $2H_2O$ | 0.1 g/l |
| pH before autoclaving | 6.0 |

The medium was autoclaved at 121° C. for 40 minutes.

Each PL-1 shake flask was inoculated with 0.5–2 ml of Boullion-3 culture broth, and shaken at 200 rpm (amplitude 2.5 cm) at 30° C. for 5 days. The culture broth from the shake flasks was pooled at harvest, totaling 3.9 1 with an enzyme yield of 53 LU/ml.

Example 2

Purification of Phospholipase

Step 1) One liter fermentation supernatant was centrifuged, and the resulting precipitate was discarded. The supernatant was then adjusted to 0.8 M ammonium acetate by adding solid ammonium acetate.

Step 2)—Hydrophobic chromatography—Toyopearl butyl 650 C matrix was purchased from Toso Hass (Röhm and Haas company, Germany). A fifty ml column was packed with the matrix. The column was washed with 50% ethanol and subsequently with water. The column was then equilibrated with 0.8 M ammonium acetate. The fermentation supernatant adjusted with 0.8 M ammonium acetate was then applied on the column. Unbound material was then washed with 0.8 M ammonium acetate until all the UV absorbing material (280 nm) was removed.

The column was then eluted with water and subsequently with 50% ethanol.

Phospholipase activity was determined at pH 4.5 and 40° C. using NEFA kit as described in above. Fractions containing activity in water and alcohol eluate were pooled. Activity was assayed at pH 4.5 using NEFA kit assay.

Fractions containing phospholipase activity were then pooled and dialyzed and concentrated using an Amicon ultrafiltration membrane with a cut of 10 kDa.

Step 3—Negative absorption on DEAE fast flow chromatography.

DEAE FF was bought from Pharmacia and a 50 ml column was packed with the matrix.

The column was then washed as described by the manufacturer and equilibrated with 25 mM Tris acetate buffer pH 7.

The dialysed and concentrated sample was then adjusted to pH 7 and conductance to 2 mSi. and applied on anionic exchanger DEAE FF column.

Activity was collected as effluent. The activity does not bind to anion exchanger at pH 7.

The effluent from the DEAE FF containing activity was concentrated and dialyzed using an Amicon membrane with acut of 10 kDa. and buffer 25 mM Sodium acetate buffer pH 6.

Gelfiltration on Superdex 75.

Superdex 75 prepacked column Hiload Tm 16/60 from Pharmacia was washed and equilibrated with 25 mM sodium acetate pH 6 containing 150 mM NaCl.

Two ml of the concentrated effluent from anion exchanger exhibiting phospholipase activity at pH 4.5 and 40 degrees was applied on the superdex column.

The activity was separated by gel filtration with a flow rate of 1 ml /minute.

Example 3

Characterization of purified phospholipase obtained from *Fusarium oxysporum*

A characterization as described below was performed on a *Fusarium oxysporum* phospholipase fermented as described in example 1 and purified as described in example 2.

The molecular weight of the phospholipase enzyme was determined by using 4 to 20% SDS-PAGE precast plates from Novex Tm. The molecular weight of the protein was determined under reducing conditions as described before.

For the *F. oxysporum* phospholipase the molecular weight was found to be 29–30 kDa under reducing conditions.

The isoelectric point was determined by using Ampholine PAGE plates from Pharmacia.

For the *F. oxysporum* pI of the protein was found to be around neutral pH, preferably in the range 5.8 to 6.8.

Thermostability of phospholipase

The thermostability of phospholipase from *Fusarium oxysporum* was tested by means of DSC (Differential Scanning Calorimetry). The thermal denaturation temperature, Td, was taken as the top of the denaturation peak in thermograms (Cp vs. T) obtained after heating of enzyme solutions at a constant, programmed heating rate.

Experimental:

A DSC II from Hart Scientific (Utah, US, 1993) was used for the experiments.

50 mM buffered solutions were used as solvent for the enzyme (approx. 2 mg/ml) at either pH 10 (50 mM Glycine buffer), pH 7 (50 mM HEPES buffer+10 mM EDTA) or pH 4 (50 mM Citrate buffer). Enzyme was purified according to example 2 above.

750 $\mu$l enzyme solution was transferred into standard 1 ml sealable hastelloy ampoules from Hart Scientific. Ampoules were loaded into the calorimeter and cooled to 5° C. for 15 min. Thermal equilibration was carried out prior to the DSC scan. The DSC scan was performed from 5° C. to 95° C. at a scan rate of approx. 90 K/hr. Denaturation temperatures were determined at an accuracy of approx. +/−2° C.

Results:

TABLE 1

Top to denaturation peak as a function of pH

| pH | Td(° C.) |
|---|---|
| 4 | 57° C. |
| 7 | 62° C. |
| 10 | 55° C. |

It should be noted that these experiments were performed in the absence of an oil matrix which may influence enzyme stability significantly. The DSC results indicate a maximum stability near neutral pH.

Assuming irreversible thermal denaturation, a relevant performance temperature in an industrial application such as degumming of oils (U.S. Pat. No. 5,264,367) is at least approx. 10 degrees lower than the Td-temperatures listed in table No 1 above.

Aminoterminal sequence

Aminoterminal analysis was determined by using Edman degradation with Applied Biosystem equipment (ABI 473A protein sequencer, Applied Biosytem, USA) carried out as described by the manufacturer.

N-terminal sequence(s):

For the F. oxysporum phospholipase the N-terminal sequence is:

N-terminal A-V-G-V-T-T-T-D-F-S-N-F-K-F-Y-I

The N-terminal amino acid "A" (Ala) is position 31 in SEQ ID NO 2. This indicates that the mature phospholipase enzyme of the invention starts at position 31 in SEQ ID No 2.

Consequently, the mature sequence is from 31–346 in SEQ ID No 2.

Example 4
Phospholipase A activity

The phospholipase A activity was determined with Soybean Lecithin as substrate as described above (NEFA test bases assay) at pH 4.5 at 40° C.

The F. oxysporum phospholipase showed significant phospholipase A activity at the conditions described above.

Example 5
Activity toward L-α-lysophosphatidylcholine

The phospholipase activity was determined with L-α-lysophosphatidylcholine as substrate as described above (NEFA test bases assay) at pH 4.5 at 40° C.

The F. oxysporum phospholipase showed significant activity against L-α-lysophosphatidylcholine at the conditions described above.

Example 6
Phospholipase activity in monolayer setup

A monolayer equipment (zero-order trough, KSV5000, KSV Instruments, Finland) has been used to evaluate the activity of various enzymes toward the phospholipid DDPC (Di Dicanoyl (C10) Phosphatidyl Choline).

Experiments

On a thoroughly purified surface of a buffer solution (10 mM TRIS, pH 8.0, 25° C.) a monolayer of DDPC was spread from a chloroform solution. After relaxation of the monolayer (evaporation of chlorofom) the surface pressure is adjusted to 15 mN/m, corresponding to a mean molecular area of DDPC of approx. 63 $Å^2$/molec. An buffer solution (see above) containing approximately 60 μg (micro gram) enzyme is injected through the monolayer into the subphase of the reaction compartment (cylinder with area 1520 $mm^2$ and volume 30400 $mm^3$) in the "zero-order trough". Enzymatic activity is manifested through the speed of a mobile barrier compressing the monolayer in order to maintain constant surface pressure as insoluble substrate molecules are hydrolysed into more water soluble reaction products. Having verified that the aqueous solubility of the reaction products (capric acid and DDPC) are considerably higher than for DDPC the number of DDPC-molecules hydrolyzed per minute by the enzyme is estimated from the mean molecular area (MMA) of DDPC.

Results

TABLE 2

Activity of enzymes towards DDPC in a monolayer setup.

| Enzyme | Activity (nmol/min) *) |
|---|---|
| Sigma P9279 (PLA2 from bee venom, 850 U/mg) | 1.9 |
| Enzyme from *Fusarium oxysporum* | 2.7 |
| *Candida antarctica* B component lipase | 0 |
| *Candida antarctica* A component lipase | 0 |
| Recombinant Guinea Pig pancreatic Lipase (rGPL) | 0.2 |
| Lipolase ® (Novo Nordisk A/S) | <0.1 |

*) Calculated from reduction in monolayer area per unit time induced by the presence of enzyme.

"Enzyme from *F. Oxysporum*" in table 2 is a phospholipase of the invention, purified as described in Example 2.

Conclusion

No phospholipase activity was detected for most of the enzymes except for lipases obtained from guinea pig lipase, which showed minor phospholipase activity.

The phospholipase of the invention obtained from *Fusarium oxysporum* showed surprisingly high significant phospholipase activity.

Consequently, in the present invention the term "phospholipase activity", used herein in connection with a phospholipase of the invention, is defined as an activity which in the "monolayer phospholipase assay" shown above is at least 0.25 nmol/min, enzyme dose: 60 μg; more preferably at least 0.40 nmol/min, enzyme dose: 60 μg; more preferably at least 0.75 nmol/min, enzyme dose: 60 μg; more preferably at least 1.0 nmol/min, enzyme dose: 60 μg; more preferably at least 1.25 nmol/min, enzyme dose: 60 μg; and even more preferably at least 1.5 nmol/min, enzyme dose: 60 μg.

The term "lipase with phospholipase side activity" is accordingly defined as a lipase with a phospholipase side activity wherein the phospholipase side activity in the "monolayer phospholipase assay" shown in Example 6 is less than the above mentioned figures specifying phospholipase activity.

An example of a lipase with phospholipase side activity according to the definitions herein is the guinea pig lipase shown in table 2 above. Said guinea pig lipase has a phospholipase side activity in the "monolayer phospholipase assay" which is less than 0.25 nmol/min, enzyme dose: 60 μg.

Example 7
Cloning and expression of a phospholipase from *Fusarium oxysporum* DSM No. 2672

Cloning and expression were performed by using the expression cloning in yeast technique as described above.

mRNA was isolated from *Fusarium oxysporum*, DSM No. 2672, grown as described above including agitation to ensure sufficient aeration. Mycelia were harvested after 3–5 days' growth, immediately frozen in liquid nitrogen and stored at −80° C. A library from *Fusarium oxysporum,* DSM No. 2672, consisting of approx. $9 \times 10^5$ individual clones was constructed in *E. coli* as described with a vector background of 1%. Plasmid DNA from some of the pools was transformed into yeast, and 50–100 plates containing 250–400 yeast colonies were obtained from each pool.

Phospholipase-positive colonies were identified and isolated on substrate plates (vide supra). cDNA inserts were amplified directly from the yeast colonies and characterized as described in the Materials and Methods section above. The DNA sequence of the cDNA encoding the phospholipase is shown in SEQ ID No. 1 and the corresponding amino acid sequence is shown in SEQ ID No. 2. In SEQ ID No. 1 DNA nucleotides from No 23 to No. 1060 define the phospholipase encoding region. The part of the DNA sequence in SEQ ID NO 1 which is encoding the mature part of the phospholipase comprises positions 113 to 1060, which correspond to amino acid positions 31–346 in SEQ ID NO 2.

The cDNA is obtainable from the plasmid in DSM 11299.

Total DNA was isolated from a yeast colony and plasmid DNA was rescued by transformation of *E. coli* as described above. In order to express the phospholipase in Aspergillus, the DNA was digested with appropriate restriction enzymes, size fractionated on gel, and a fragment corresponding to the phospholipase gene was purified. The gene was subsequently ligated to pHD414, digested with appropriate restriction enzymes, resulting in the plasmid pA2PH10.

After amplification of the DNA in *E. coli* the plasmid was transformed into *Aspergillus oryzae* as described above.

Test of *A. oryzae* transformants

Each of the transformants were tested for enzyme activity as described above. Some of the transformants had phospholipase activity which was significantly higher than the *Aspergillus oryzae* background. This demonstrates efficient expression of the phospholipase in *Aspergillus oryzae.*

Example 8
Recombinant expression of an *F. oxysporum* phospholipase

An *A.oryzae* transformant comprising the Aspergillus expression vector pA2PH10 (See example 7) was fed batch fermented as described above. Purification of the recombinantly produced *F. oxysporum* phospholipase was performed as described in example 2.

Example 9
Characterization of a recombinantly expressed and purified phospholipase obtained from *Fusarium oxysporum*

The characterization was performed on a recombinantly expressed and subsequently purified *Fusarium oxysporum* phospholipase (see example 8).

These characterization results in respect of the recombinant *F. oxysporum* phospholipase of the invention correlated perfectly with the characterization results shown in example 3, where it was demonstrated that the recombinantly expressed and purified enzyme was the same as the non-recombinantly expressed and purified phospholipase characterized in example 3.

General assays used to characterize a recombinantly produced phospholipase obtained from *F. oxysporum*

Phospholipase assays:

Phospholipase activity (PHLU) was measured as the release of free fatty acids from lecithin. 50 µl 4% L-alpha-phosphatidylcholine (plant lecithin from Avanti, USA), 4% Triton X-100, 5 mM $CaCl_2$ in 50 mM HEPES, pH 7 was added, 50 µl enzyme solution diluted to an appropriate concentration in 50 mM HEPES, pH 7. The samples were incubated for 10 min at 30° C. and the reaction stopped at 95° C. for 5 min prior to centrifugation (5 min at 7000 rpm). Free fatty acids were determined using the NEFA C kit from Wako Chemicals GmbH; 25 µl reaction mixture was added to 250 µl reagent A and incubated for 10 min at 37° C. Then 500 µl Reagent B was added and the sample was incubated again, 10 min at 37° C. The absorption at 550 nm was measured using an HP 8452A diode array spectrophotometer. Samples were run at is least in duplicates. Substrate and enzyme blinds (preheated enzyme samples (10 min at 95° C.)+substrate) were included. Oleic acid was used as a fatty acid standard. 1 PHLU equals the amount of enzyme capable of releasing 1 µmol of free fatty acid/min under these conditions.

Alternatively, the assay was run at 37° C. in 20 mM citrate buffer, pH 5 ($Ca^{2+}$-dependence) or 20 mM Britton-Robinson buffer (pH-profile/temperature-profile/stability).

Phospholipase A1 activity (PLA1) was measured using 1-(S-decanoyl)-2-decanoyl-1-thio-sn-glycero-3-phosphocholine (D3761 Molecular Probes) as a substrate. 190 µl substrate (100 µl D3761 (2 mg/ml in ethanol)+50 µl 1% Triton X-100+1.85 ml 50 mM HEPES, 0.3 mM DTNB, 2 mM $CaCl_2$, pH 7) in a 200 µl cuvette were added to 10 µl enzyme, and the absorption at 410 nm was measured as a function of time on the HP 8452A diode array spectrophotometer at room temperature. Activity was calculated as the slope of the curve in the linear range. PLA1 equals the amount of enzyme capable of releasing 1 µmol of free fatty acid (thiol)/min at these conditions.

Phospholipase A2 activity (PLA2) was measured at 40° C. using 1-hexadecanoyl-2-(1-pyrenedecanoyl)-sn-glycero-3-phosphocholine (H361 Molecular Probes). 2 ml substrate (50 µl 1% Triton X-100+25 µl 0.1% H361 in methanol+10 ml 50mM HEPES, pH 7) in a 2 ml cuvette with stirring was added to 10 µl enzyme, and the pyrene fluorescence emission was measured at 376 nm (excitation at 340 nm) as a function of time (1 sec. intervals) using the Perkin Elmer LS50 apparatus. In the Triton X-100/phospholipid micelles the concentration of phospholipid was adjusted to have excimer formation (emits at 480 nm). Upon cleavage the fatty acid in the 2-position containing the pyrene group is released into the aqueous phase resulting in an increase in the monomer emission. PLA2 was taken as the slope of the curve in the linear range at equal conditions.

Lipase assays:

Lipase activity (LU) was measured according to Novo Nordisk publication AF 95. The hydrolysis of tributyrin at 30° C. at pH 7 was followed in a pH-stat titration experiment. 1 LU equals the amount of enzyme capable of releasing 1 µmol butyric acid/min under standard conditions.

Activity on olive oil (SLU) was measured as follows: 12 ml 5 mM Tris-HCl, 40 mM NaCl, 5 mM $CaCl_2$, pH 9 was to added 2.5 ml Sigma Lipase Substrate. The pH was adjusted to pH 9 or just below prior to adding 0.5 ml lipase solution (diluted in buffer) and running a pH-stat titration assay at 30° C. using the Titralab commercially available from Radiometer A/S, Copenhagen, Denmark. 1 SLU equals the amount of enzyme capable of releasing 1 µmol of free fatty acid/min at pH 9, 30° C.

Characterization of a recombinantly produced *F. oxysporum* phospholipase of the invention The assays used to characterize the enzymes mentioned below were the assays described immediately above.

Enzymes:

PL from *Fusarium oxysporum* having the amino acid sequence shown in SEQ NO 2.

Batch F-9700989, $OD_{280}$ 0.83 (0.69 mg/ml), purity>95% (SDS-PAGE).

The enzyme was recombinantly expressed and purified as described above.

Lecitase™ Batch L546-F06 (10368 IU/ml, approx. 20 mg/ml) Lipolase® (Nova Nordisk A/S)

The influence of $Ca^{2+}$ on the phospholipase activity of the *F. oxysporum* lipase/phospholipase was investigated. No major difference was observed no matter whether EDTA or $Ca^{2+}$ was included in the assay or not (see Table 3 below), and thus the enzyme appears to be relatively independent of $Ca^{2+}$.

TABLE 3

*F. oxysporum* phospholipase activity (PHLU) dependence on EDTA and $CaCl_2$-2% Lecithin, 2% Triton X-100, 20 mM citrate, pH 5 at 37° C.

| | 5 mM EDTA | 1 mM EDTA | 1 mM $CaCl_2$ | 2 mM $CaCl_2$ | 5 mM $CaCl_2$ | 10 mM $CaCl_2$ |
|---|---|---|---|---|---|---|
| Relative activity[1] | 1.05 | 1.10 | 1 | 0.90 | 0.90 | 0.89 |

[1]Relative activity is relative to the activity at 1 mM $CaCl_2$, which is normalized to 1.

The pH-profile was studied in Britton-Robinson buffer using plant lecithin as a substrate (Table 4). Although the enzyme shows an alkaline pH-profile on phospholipid with an optimum at pH 9 or higher, the activity is still sufficiently high to provide degumming of oils at low pH and performance in baking (see below for a comparison of specific activities).

TABLE 4

*Fusarium oxysporum* phospholipase pH-profile 2% Lecithin, 2% Triton X-100, 20 mM BR, 37° C.

| | pH 3 | pH 4 | pH 5 | pH 6 | pH 7 | pH 8 | pH 9 |
|---|---|---|---|---|---|---|---|
| Relative activity[1] | 0.08 | 0.12 | 0.16 | 0.28 | 0.52 | 0.76 | 1.00 |

[1]Relative activity is relative to the activity at pH 9 which is normalized to 1.

Temperature profiles for the phospholipase were obtained at pH 5; activity starts to decline at temperatures above 40° C. (Table 5). This is in reasonable agreement with the temperature stability measured by pre-incubating the enzyme and then measuring the residual activity (Table 6), where the enzyme is stable at temperatures up to 45° C. at pH 5.

TABLE 5

*F. oxysporum* phospholipase temperature profile 2% Lecithin, 2% Triton X-100, 20 mM BR.

| | 30° C. | 40° C. | 45° C. | 50° C. | 55° C. |
|---|---|---|---|---|---|
| pH 5 | 0.85 | 1.00 | 0.67 | 0.38 | 0.13 |

All data are shown as relative activity data relative to the activity at pH 5, 40° C., which is normalized to 1.

TABLE 6

Temperature stability of *F. oxysporum* phospholipase; pre-incubation 30 min in 20 mM BR

| | 5° C. | 30° C. | 40° C. | 45° C. | 50° C. | 55° C. |
|---|---|---|---|---|---|---|
| pH 5 | 1.00 | 0.91 | 1.03 | 1.07 | 0.65 | 0.00 |

All data are shown as residual activity data, where the activity after pre-incubation at 5° C. is normalized to 1.

The low stability of the enzyme is may be advantageously to register an eventual product as a process aid as the active enzyme should not be expected in the final product in either degumming of edible oils or baked products.

The phospholipase obtained from *Fusarium oxysporum* of the invention has both phospholipase and lipase activity.

Accordingly, the activity of the enzyme on various different lipase and phospholipase substrates was investigated and compared to the activity of the commercially available phospholipase Lecitase™, and the commercially available lipase Lipolase® (Novo Nordisk A/S)

The *F. oxysporum* phospholipase/lipase has high activity on both tributyrin and olive oil at pH 7 and 9 (Table 7). For comparative reasons the specific activity of Lipolase® is around 5000 LU/mg. However, contrary to Lipolase®, the *F. oxysporum* lipase exhibits a much broader specificity with considerable phospholipase activity and also thioesterase activity (see monolayer example 6 above, showing that Lipolase® does not have a measurable phospholipase activity).

The *F. oxysporum* phospholipase/lipase of the invention has a specific activity on lecithin considerably higher than that of the phospholipase Lecitase™ (pig pancreatic PLA2) at pH 7 (Table 7).

Compared to Lecitase™ the *F. oxysporum* enzyme has a 100 fold higher activity at pH 7. The phospholipase:lipase ratio for the *F. oxysporum* enzyme is around 0.225 (1000 LU/mg/225 PHLU/mg) under similar conditions (pH 7 and 30° C.).

TABLE 7

Activity of the *F. oxysporum* lipase/phospholipase-comparison to Lecitase ™.

| Enzyme | LU/mg | PLU[1]/mg | PHLU/mg | SLU/mg | PLA1/mg |
|---|---|---|---|---|---|
| *F. oxysporum* | 1000 | 73 | 225 | 3090 | 2.04 |
| Lecitase | <0.25 | 2.5 | 1.2–3.2 | 0.6 | 0 |

[1]PLU was measured like PHLU but in 20 mM citrate, pH 5 and at 37° C. instead of 50 mM HEPES, pH 7 at 30° C.

The specificity of the *F. oxysporum* lipase/phospholipase was investigated using substrates specific for phospholipase A1; measuring the cleavage of the thio-ester linkage in the 1-position of 1-(S-decanoyl)-2-decanoyl-1-thio-sn-glycero-3-phosphocholine.

The enzyme clearly hydrolyses the 1-position in phospholipid (Table 7), while Lecitase™ (pig pancreatic PLA2) as expected showed no activity on this substrate.

C-terminal amino acid sequence of the *Fusarium oxysporum* phospholipase of the invention The N-terminal amino acid sequence of the recombinantly expressed mature phospholipase protein was determined as described in example 3, and this N-terminal sequence was confirmed to be the same as determined for the non-recombinantly produced and purified enzyme (see example 3).

MALDI-TOF mass spectrometry was carried out using a VG TofSpec mass spectrometer (Micromass, Manchester, UK) as described in Christgau et al. Biochem. J. 319, 705–712, 1996.

Background

The N-terminal amino acid sequence of the *Fusarium oxysporum* phospholipase, as deduced from the DNA sequence, foresees in combination with the known N-terminal amino acid sequence of the mature phospholipase a protein of 315 amino acid residues (Amino acids 31–346 in SEQ ID NO 2). The theoretical mass of this predicted protein is 33,256.8 Da.

Using MALDI-TOF mass spectrometry we have previously determined the mass of the authentic lipase/phospholipase from *F. oxysporum* to be 28.2 kDa (data not shown), and on SDS-PAGE it was shown that the molecular weight is 29–30 kDa (vide supra).

As the N-terminal amino acid sequences of the authentic and the recombinant *F. oxysporum* lipases are identical it is likely that the mass difference seen between the predicted mass and the experimental mass is caused by C-terminal processing.

To investigate this we have isolated the C-terminal peptide from the recombinant *F. oxysporum* lipase expressed in *A. oryzae* and sequenced it through its C-terminus.

Strategy

The average mass of the authentic lipase/phospholipase from *F. oxysporum* of 28.2 kDa can be used to predict the most likely C-terminal residue which turns out to be Ser303 (SEQ ID No 2).

This deduction is based on the assumption that the enzyme is non-glycosylated. The single potential N-glycosylation site found in the sequence at Asn163 is probably not used since a Pro-residue is found at position 164. The presence of a Pro-residue as the second residue in the consensus sequence for N-glycosylation (Asn-Xaa-Ser/Thr) has never been reported. In addition, the shape of the peak in the mass spectrum does not indicate glycosylation. However, the peak is broader than usually encountered for homogeneous proteins, which indicates the possibility of size heterogeneity. As the N-terminus of the enzyme is well-defined, the size heterogeneity most likely has its basis in heterogeneous C-terminal processing.

Inspection of SEQ ID NO 2 (see below) reveals that the predicted C-terminus is located closely to the last of the 8 Cys-residues in the sequence. Introduction of a radioactive tag on the Cys-residues makes the peptides containing Cys-residues easy to trace through peptide purification. Combining the radioactive Gagging with proteolytic degradation using the Asp-N protease that cleaves in front of Asp-residues would result in a tagged C-terminal peptide. In addition, three internal peptides would be tagged. Sequencing all tagged peptides should reveal the C-terminus of the enzyme.

```
                                          ↓             ↓         ↓
 31  AVGVTTTDFS NFKFYIQHGA AAYCNSEAAA GSKITCSNNG CPTVQGNGAT   80
                                                                ↓
 81  IVTSFVGSKT GIGGYVATDS ARKEIVVSFR GSINIRNWLT NLDFGQEDCS  130

↓                          (◊)
131  LVSGCGVHSG FQRAWNEISS QATAAVASAR KANPSFNVIS TGHSLGGAVA  180

181  VLAAANLRVG GTPVDIYTYG SPRVGNAQLS AFVSNQAGGE YRVTHADDPV  230

↓         ↓
231  PRLPPLIFGY RHTTPEFWLS GGGGDKVDYT ISDVKVCEGA ANLGCNGGTL  280

↓
281  GLDIAAHLHY FQATDACNAG GFSWRRYRSA ESVDKRATMT DAELEKKLNS  330
                                     ↑
331  YVQMDKEYVK NNQARS                                      346
```

SEQ ID NO 2: Predicted amino acid sequence of the *F. oxysporum* lipase/phospholipase The sequence is deduced from the DNA sequence and starts at the N-terminus determined experimentally for both the authentic and the recombinant enzyme. The 8 Cys-residues are indicated by ↓ while the C-terminal Ser-residue predicted from MALDI-TOF mass spectrometry of the authentic enzyme is indicated by ↑. The Asn-residue found in the consensus sequence for N-glycosylation (NXS/T) is shown by (◊) but is in all likelihood not used as X is a Pro-residue.

Experimental Results

Enzyme was PL from *Fusarium oxysporum* having the amino acid sequence shown in SEQ NO 2.

Batch F-9700989, $OD_{280}$ 0.83 (0.69 mg/ml), purity>95% (SDS-PAGE).

The enzyme was recombinantly expressed and purified as described above.

The enzyme was denatured and the disulfide-bonds were reduced before the thiol-groups were reacted with $I[1-^{14}C]$ $CH_2CONH_2$.

Following the radioactive tagging of the Cys-residues the lipase was degraded using the Asp-N protease.

The generated peptides were fractionated using reversed phase HPLC. The collected fractions were subjected to MALDI-TOF mass spectrometry and scintillation counting. Fractions containing significant amounts of radioactivity were selected for repurification using reversed phase HPLC.

The re-purified fractions were subjected to scintillation counting and the fractions containing radioactivity were subsequently sequenced.

Below is given a summary of the results. This scheme may look chaotic due to the many sequences given. However, the scheme contains all the sequence data obtained from the radioactive fractions, and thus it represents the basis for the conclusion drawn. It should be noted that all Cys-residues have been covered through the sequencing; most of them more than once. Another thing to note is the aberrant cleavages seen resulting in a large number of small radioactively tagged peptides.

```
                                          |      |    |
                                          NG     CPT
                                          NNG    CPTVQ
                                          CSN
                                          CSNNG  CP
                                          CSNNG  CPTV
                               CNSEAAA    GSKI
 31 AVGVTTTDFS NFKFYIQHGA AAYCNSEAAA GSKITCSNNG CPTVQGNGAT 80
                                                    |
                                                    DCS
                                                    DCS
 81 IVTSFVGSKT GIGGYVATDS ARKEIVVSFR GSINIRNWLT NLDFGQEDCS 130
       |
    LVSGC
    LVSGCGVHSG FQRAW
131 LVSGCGVHSG FQRAWNEISS QATAAVASAR KANPSFNVIS TGHSLGGAVA 180

181 VLAAANLRVG GTPVDIYTYG SPRVGNAQLS AFVSNQAGGE YRVTHADDPV 230
                                   |           |
                                   DVKVCEG
                                   DVKVCEGA    ANLGCNGGTL
                                   DVKVCEGA    ANLGCNGGTL
231 PRLPPLIFGY RHTTPEFWLS GGGGDKVDYT ISDVKVCEGA ANLGCNGGTL 280
       |
                     DACNAG GFS
    GL               TDACNAG GF
281 GLDIAAHLHY FQATDACNAG GFSWRRYRSA ESVDKRATMT DAELEKKLNS 330
                     ↑

331 YVQMDKEYVK NNQARS                346 (residues 31-346 of SEQ ID NO:2)
```

The amino acid sequences obtained by sequencing of the radioactively tagged peptides derived from recombinant F. oxysporum enzyme. The sequences are aligned to the predicted amino acid sequence as deduced from the DNA sequence. The 8 Cys-residues are indicated by ⇓ while the C-terminal Ser-residue predicted from MALDI-TOF mass spectrometry of the authentic enzyme is indicated by ↑.

Experimental conclusion

From the sequencing of all the radioactively tagged peptides it is clear that the C-terminal part of the amino acid sequence encoded in the DNA is processed during expression of the lipase from *F. oxysporum.* The peptide sequences point to Ser303 as the most likely C-terminal residue in the mature enzyme in accordance with the result from MALDI-TOF mass spectrometry.

Based on the data it cannot, however, be ruled out that differential C-terminal processing occurs leading to heterogeneous C-termini; e.g. one peptide indicates that Phe272 could also be found as a C-terminal residue.

Example 10

General description of assay for enzymatic degumming of edible oil

Equipment for carrying out enzymatic degumming

The equipment consists of a 1 l jacketed steel reactor fitted with a steel lid, a propeller (600 rpm), baffles, a temperature sensor, an inlet tube at the top, a reflux condenser (4° C.) at the top, and an outlet tube at the bottom. The reactor jacket is connected to a thermostat bath. The outlet tube is connected via silicone tubing to a Silverson in-line mixer head equipped with a "square hole high shear screen", driven by a Silverson L4RT high shear lab mixer (8500 rpm, flow ca. 1.1 l/minute). The mixer head is fitted with a cooling coil (5–10° C.) and an outlet tube, which is connected to the inlet tube of the reactor via silicone tubing. A temperature sensor is inserted in the silicone tubing just after the mixer head. The only connection from the reactor/mixer head system to the atmosphere is through the reflux condenser.

General procedure for carrying out enzymatic degumming

All cooling and thermostat equipment is turned on. Then 0.6 l (ca. 560 g) of oil is loaded in the reactor, which is kept at about the temperature needed for the specific experiment. The lab mixer is turned on, whereby the oil starts to circulate from the reactor to the mixer head and back to the reactor. The system is allowed to equilibrate for about 10 minutes, during which period the temperature is fine tuned. The pre-treatment period starts with addition of 0.6 g (2.86 mmol) citric acid monohydrate in 27 g MilliQ water (added water vs. oil equals 4.8% w/w; [citric acid] in water phase=106 mM, in water/oil emulsion=4.6 mM), which sets t=0. At t=30 minutes a suitable amount of 4 M NaOH solution is added.

| | | |
|---|---|---|
| 0.0 equiv. 4 M NaOH | | →pH 3.7 |
| 1.0 equiv. 4 M NaOH | (0.714 ml) | →pH 4.5 |
| 1.5 equiv. 4 M NaOH | (1.07 ml) | →pH 5.0 |
| 2.0 equiv. 4 M NaOH | (1.43 ml) | →pH 5.5 |
| 2.5 equiv. 4 M NaOH | (1.79 ml) | →pH 6.2 |
| 3.0 equiv. 4 M NaOH | (2.14 ml) | →pH 8.0 |

At t=35 minutes samples are drawn for P-analysis and pH determination. Just after this the required amount of enzyme solution is added (end of pre-treatment period). Samples for P-analysis and pH determination are drawn at t=1, 2, 3.5, 5, 6 hours, and then the reaction is stopped.

The reactor/mixer system is emptied and rinsed with 2×500 ml 10% Deconex/DI water solution followed by minimum 3×500 ml of DI water. Table 8 is a presentation of the various additions and samplings during the reaction.

TABLE 8

Schedule for enzymatic degumming

| Time | Addition of | Sampling P-analysis | pH determination |
|---|---|---|---|
| 0 | Citric acid | | X |
| 5 min. | | | X |
| 30 min. | | X | X |
| 30 + δ min. | NaOH | | |
| 35 min. | | X | X |
| 35 + δ min. | Enzyme | | |
| 1 hour | | X | X |
| 2 hours | | X | X |
| 3.5 hours | | X | X |
| 5 hours | | X | X |
| 6 hours | | X | X |

Phosphorus analysis:
Sampling for P-analysis:

Take 10 ml of water in oil emulsion in a glass centrifuge tube. Heat the emulsion in a boiling water bath for 30 minutes. Centrifuge at 5000 rpm for 10 minutes. Transfer about 8 ml of upper (oil) phase to a 12 ml polystyrene tube and leave it (to settle) for 12–24 hours. After settling draw about 1–2 g from the upper clear phase for P-analysis.

P-analysis was carried out according to procedure 2.421 in "Standard Methods for the Analysis of Oils, Fats, and Derivatives, $7^{th}$ ed. (1987)":

Weigh 100 mg of MgO (leicht, Merck #5862) in a porcelain dish and heat with a gas burner. Add 1–2 g of oil and ignite with a gas burner to give a black, hard mass. Heat in a Vecstar furnace at 850° C. for 2 hours to give white ashes. Dissolve the ashes in 5 ml of 6 M $HNO_3$ and add 20 ml of reagent mix. Leave for 20 minutes. Measure absorbance at 460 nm (use a blank (5 ml $HNO_3$+20 ml reagent mix) for zero adjustment). Calculate by using calibration curve.

pH determination

Take 2 ml of water in oil emulsion and mix with 2 ml of MilliQ water. After phase separation, pipette off top oil layer. Measure pH in aqueous phase with pH electrode Orion. Measurements are transformed to "real" pH values by the formula $$pH_{real} = pH_{measured} - 0.38.$$

A calibration curve was obtained by dissolving 0.6 g of citric acid monohydrate in 27 g of DI water; pH of this solution was measured by pH electrode Orion ($pH_{real}$). 100 μl were mixed with 2 ml MilliQ water, and pH of this solution was measured by pH elect rode Orion ($pH_{measured}$). pH of the citric acid solution was changed gradually by adding NaOH solution, and for each adjustment dilution and pH measurements were carried out as described above.)

Example 11
Optimal degumming conditions for Lecitase™

All experiments concerning degumming of edible oil were performed as described in example 10.

Oil:
Water degummed rape seed oil (Colzro) from Aarhus Oliefabrik, Denmark.

Batch C00730/B01200, 9 kg, P-content 186 ppm (0.47% phosphatide).

The oil is not a commercially available product, but taken directly from the production line at the mill.

Enzyme:
Lecitase™ 10L

Batch L646-F02 (10190 U/ml), estimated conc. 20 mg/ml.

The specific conditions for a series of parameter optimisation experiments with Lecitase™ are given in Table 9. Standard conditions are: enzyme dosage 535 U/kg oil (1.1 mg/kg oil), 60° C., 2.0 eq. NaOH (pH 5.5). The enzyme dosage has been varied from 268–1070 U/kg oil, the temperature has been varied from 40–70° C., and NaOH addition has been varied from 1.0–3.0 eq. corresponding to the various pH levels as shown in Table 9.

TABLE 9

Specific conditions for Lecitase ™ optimisation

| Experiment # | Rape seed oil | Temp. (° C.) | Eq. NaOH | pH level* | Enzyme dosage (U/kg oil) |
|---|---|---|---|---|---|
| 10 | Colzro 1200 | 60° C. | 2.0 | 5.5 | 0 (blank) |
| 21 | Colzro 1208 | 60° C. | 0.0 | 3.7 | 0 (blank) |
| 8 | Colzro 1200 | 60° C. | 2.0 | 5.5 | 535 |
| 9 | Colzro 1200 | 60° C. | 2.0 | 5.5 | 535 |
| 11 | Colzro 1200 | 60° C. | 2.0 | 5.5 | 268 |
| 12 | Colzro 1200 | 60° C. | 2.0 | 5.5 | 1070 |
| 15 | Colzro 1200 | 70° C. | 2.0 | 5.5 | 535 |
| 17 | Colzro 1200 | 50° C. | 2.0 | 5.5 | 535 |
| 18 | Colzro 1200 | 40° C. | 2.0 | 5.5 | 535 |
| 19 | Colzro 1200 | 60° C. | 1.0 | 4.5 | 535 |
| 40 | Colzro 1209 | 60° C. | 1.5 | 5.0 | 535 |
| 44 | Colzro 1429 | 60° C. | 2.5 | 7.0 | 535 |
| 20 | Colzro 1200 | 60° C. | 3.0 | 8.0 | 535 |

*pH from t = 35 min.-6 hours. Within this time period all pH determinations were within a narrow window. This is further illustrated in example 13 below.

Presentations of the separate optimisation studies are given in table 10.

The results in table 10 show that,
i) from the dose/response investigation it is seen that optimal enzyme dose (at 60° C. and 2.0 eq. NaOH) is about 535 U/kg oil. Half dosage increases degumming time from about 3.5 to 6 hours, and double dosage does not bring about any change in degumming performance. The enzyme blank results have been inserted for comparison;
ii) that optimal NaOH addition is about 2.0 eq. (pH at about 5.5), with bad performance at 1.0 eq. (pH at about 4.5) and 3.0 eq. (pH at about 8);
iii) that optimum temperature is about 60° C., since 70° C. does not bring the P-level totally down, 50° C. increases degumming time from about 3.5 to 6 hours, and 40° C. gives bad performance.

TABLE 10

Results of optimisation of Lecitase ™ degumming conditions

| Ex # | Time[1] 0 | Time[1] 0.50 | Time[1] 0.58 | Time[1] 1.0 | Time[1] 2.0 | Time[1] 3.5 | Time[1] 5.0 | Time[1] 6.0 |
|---|---|---|---|---|---|---|---|---|
| 10 | 160 | 140 | 116 | 118 | 108 | 109 | 105 | 109 |
| 21 | 178 | 149 | — | 143 | 142 | 143 | 147 | 154 |
| 8 | 164 | 139 | 117 | 85 | 30 | — | 2 | 3 |
| 9 | 164 | 136 | 109 | 79 | 14 | 4 | 3 | 4 |
| 11 | 183 | 149 | 123 | 104 | 78 | 35 | 10 | 7 |
| 12 | 165 | 131 | 117 | 71 | 13 | 3 | 4 | 3 |
| 15 | 170 | 139 | 127 | 83 | 23 | 10 | 11 | 9 |
| 17 | 162 | 134 | 127 | 95 | 56 | 15 | 11 | 5 |
| 18 | 176 | 151 | 136 | 100 | 66 | 28 | 24 | 28 |
| 19 | 171 | 139 | 147 | 142 | 142 | 118 | 91 | 80 |
| 40 | 184 | 149 | 157 | 126 | 109 | 73 | 40 | 30 |
| 44 | 226 | 202 | 197 | 148 | 99 | 66 | 40 | 34 |
| 20 | 165 | 136 | 111 | 102 | 90 | 81 | 73 | 72 |

[1]Phosphorus content (ppm) in oil phase at indicated times in hours.

Example 12
Optimal degumming conditions for a *Fusarium oxysporum* phospholipase according to the invention All enzymatic degumming of edible oil experiments was performed as described in example 10.
Oil:
Water degummed rape seed oil (Colzro) from Aarhus Oliefabrik, Denmark.

Batch C00730/B01208, P-content about 200 ppm

Batch C00730/B01209, P-content about 200 ppm

Batch C00730/B01429, P-content 227 ppm

Batch C00730/B01430, P-content 252 ppm

The oils are not commercially available, but taken directly from the production line at the mill.

Enzyme:

PL from *Fusarium oxysporum* having the amino acid sequence shown in SEQ NO 2.

Batch F-9700123, $OD_{280}$ 1.48, purity ca. 58%, estimated conc. 0.9 mg/ml.

The enzyme was recombinantly expressed and purified as described above.

The specific conditions for a series of parameter optimisation experiments with PL from *Fusarium oxysporum* are given in Table 11. Standard conditions are: enzyme dosage 1.6 mg/kg oil, 40° C., 1.5 eq. NaOH (pH about 5.0). The enzyme dosage has been varied from 0.2–1.6 mg/kg oil, the temperature has been varied from 30–50° C., and the NaOH addition has been varied from 1.0–2.5 eq. corresponding to the various pH levels as shown in Table 11.

TABLE 11

Specific conditions for optimisation of PL from *Fusarium oxysporum.*

| Experiment # | Rape seed oil | Temp. (° C.) | Eq. NaOH | pH level* | Enzyme dosage (mg/kg oil) |
|---|---|---|---|---|---|
| 31 | Colzro 1208 | 40° C. | 1.5 | 5.0 | 1.6 |
| 53 | Colzro 1429 | 40° C. | 1.5 | 5.3 | 1.6 |
| 33 | Colzro 1209 | 40° C. | 1.5 | 5.0 | 0.8 |
| 35 | Colzro 1209 | 40° C. | 1.5 | 5.0 | 0.4 |
| 36 | Colzro 1209 | 40° C. | 1.5 | 5.0 | 0.2 |
| 38 | Colzro 1209 | 50° C. | 1.5 | 5.0 | 1.6 |
| 64 | Colzro 1430 | 45° C. | 1.5 | 5.0 | 1.6 |
| 39 | Colzro 1209 | 30° C. | 1.5 | 5.0 | 1.6 |
| 32 | Colzro 1209 | 40° C. | 1.0 | 3.5 | 1.6 |
| 13 | Colzro 1200 | 40° C. | 1.0 | 4.5 | 1.6 |
| 45 | Colzro 1429 | 40° C. | 1.25 | 5.0 | 1.6 |
| 46 | Colzro 1429 | 40° C. | 1.15 | 5.5 | 1.6 |
| 34 | Colzro 1209 | 40° C. | 2.0 | 5.5 | 1.6 |
| 37 | Colzro 1209 | 40° C. | 2.5 | 6.2 | 1.6 |

The experimental results are presented in table 12 below. The pH deviations in the time window 35 min.–6 hours all fell within the expected intervals with only minor irregularities.

In summary, the results in table 12 below show that, i) from the dose/response tests it is seen that the optimal enzyme dose (at 40° C. and 1.5 eq. NaOH) is about 0.8 mg/kg oil;

ii) optimal NaOH addition is about 1.5 eq. (pH about 5.0), with no performance at 1.0 eq. (pH about 4.5), and with limited performance at 2.0 eq. (pH about 5.5) and 2.5 eq. (pH about 6.2); and iii) the optimum temperature is around 45° C., and 50° C. gives limited performance.

TABLE 12

Results of *Fusarium oxysporum* degumming conditions optimisation

| Ex # | Time[1] 0 | Time[1] 0.50 | Time[1] 0.58 | Time[1] 1.0 | Time[1] 2.0 | Time[1] 3.5 | Time[1] 5.0 | Time[1] 6.0 |
|---|---|---|---|---|---|---|---|---|
| 31 | 169 | 130 | 136 | 15 | 8 | 7 | 8 | 7 |
| 53 | 232 | 203 | 208 | 32 | 10 | 7 | 7 | 4 |
| 33 | 188 | 156 | 160 | 27 | 7 | 6 | 6 | 8 |
| 35 | 181 | 153 | 153 | 78 | 5 | 5 | 4 | 6 |
| 36 | 187 | 162 | 157 | 117 | 61 | 32 | 20 | 15 |
| 38 | 187 | 149 | 146 | 84 | 83 | 68 | 58 | 55 |
| 64 | 252 | 192 | 201 | 10 | 4 | 4 | 4 | 4 |
| 39 | 184 | 163 | 158 | 36 | 7 | 7 | 9 | 9 |
| 32 | 167 | 137 | 165 | 152 | 146 | 151 | 148 | 146 |
| 13 | 170 | 140 | 141 | 140 | 133 | 126 | 130 | 131 |
| 45 | 221 | 189 | 195 | 161 | 118 | 99 | 92 | 95 |
| 46 | 225 | 187 | 163 | 93 | 4 | 7 | 6 | 15 |
| 34 | 189 | 174 | 165 | 61 | 27 | 25 | 26 | 19 |
| 37 | 205 | 168 | 157 | 88 | 22 | 23 | 20 | 21 |

[1]Phosphorus content (ppm) in oil phase at indicated times in hours.

Example 13
Illustration of standard pH deviations during an enzymatic degumming process The table 13 below shows an average example of pH deviation during the enzymatic degumming process carried out as described in Example 10.

The experiments are carried out with Lecitase™. See example 11 for further details.

TABLE 13 pH values from t = 35 min.-6 hours.

| Time (hours) | pH Ex. #8 (2.0 q.) | pH Ex. #15 (2.0 q.) | pH Ex. #19 (1.0 q.) | pH Ex. #20 (3.0 q.) |
|---|---|---|---|---|
| 0.58 | 4.97 | 5.80 | 4.45 | 7.38 |
| 1.0 | 5.82 | 5.75 | 4.46 | 7.63 |
| 2.0 | 5.50 | 5.44 | 4.57 | 8.13 |
| 3.5 | 5.35 | 5.34 | — | 8.37 |
| 5.0 | 5.25 | 5.47 | 4.47 | 8.21 |
| 6.0 | 5.01 | 5.26 | 4.43 | 8.05 |

If no further mentioned in examples of enzymatic degumming experiments disclosed herein, the standard pH deviations in said experiments were as shown in table 13 above.

Example 14
Comparison of enzymatic degumming capacity of Lecitase™ and a phospholipase from *Fusarium oxysporum* according to the invention.

In FIG. 2 the results from the PL's under their respective optimal conditions are shown, as determined in examples 11 and 12 above.

Experimental conditions shown in FIG. 2:
Lecitase™: 60° C., pH 5.5 (2.0 eq. NaOH), and 1 mg enzyme/kg oil (about 535 U)(exp. #9).
*Fusarium oxysporum* PL: 40° C., pH 5.0 (1.5 eq. NaOH), and 0.8 mg enzyme/kg oil (exp. #33).
*Fusarium oxysporum* PL: 45° C., pH 5.0 (1.5 eq. NaOH), and 1.6 mg enzyme/kg oil (exp. #64).

Apparently, the PL from *Fusarium oxysporum* gives a very fast degumming effect as compared to Lecitase™.

The PL from Fusarium, according to the invention, gives an almost total degumming after about 25 minutes of contacting with the enzyme to the oil.

Example 15
Determination of amount of non-hydratable phospholipids present in different types of edible oils Oils:
Crude rape seed oil from Århus Oliefabrik (AOM), Denmark. Batch C00745/B01146, P-content 609 ppm. This batch contains solid residues.
Crude rape seed oil from Scanola, (Denmark)
Batch C00745/B01593, P-content 315 ppm.
Filtered crude rape seed oil
Batch C00745/B01146 filtered, P-content 231 ppm.
This oil-is Batch C00745/B01146 above (609 ppm) filtered through a 100 μm Johnson filter.
Crude rape seed oil from Århus Oliefabrik (AOM), Denmark. Batch C00745/B01700, P-content 459 ppm.
Rape seed oil from Lurgi, Germany
Batch C00932/B01381, P-content 148 ppm.
Crude soybean oil from Århus Oliefabrik, Denmark.
Batch C00744/B01145, P-content 593 ppm
Determination of the amount of non-hydratable phospholipids present in the different types of edible oils shown above was carried out by pre-treatment of the oils by a solution comprising citric acid monohydrate in water as described in example 10 above.

Briefly, the pre-treatment process comprises,
i) pre-treating the edible oil, at 60° C., by addition of a solution comprising citric acid monohydrate in water (added water vs. oil equals 4.8% w/w; [citric acid] in water phase=106 mM, in water/oil emulsion=4.6 mM) for 30 minutes;
ii) transferring 10 ml of the pre-treated water in oil emulsion to a tube;
iii) heating the emulsion in a boiling water bath for 30 minutes;
iv) centrifuging at 5000 rpm for 10 minute,
v) transferring about 8 ml of upper (oil) phase to a new tube and leaving it to settle for 24 hours;
after settling draw 2 g from upper clear phase for measurement of the non-hydratable phosphorus content (ppm) in the edible oil. The ppm value was determined as described in example 10 above.

Following this process, the amount of non-hydratable phospholipids present in the different types of edible oils shown above was,
the crude rape seed oil #1146 from AOM contains solid particulate matter which is partly responsible for the high P-level (609 ppm); filtering through a 100 μm Johnson sieve gave a clear oil with a P-content of 231 ppm.

Pre-treatment of the crude oil and of the filtered oil gave a P-level of 140 ppm, which is a measure of the non-hydratable phospholipids present in the oil;

the phospholipid content of a crude rape seed oil from Scanola was reduced from 315 ppm to about 30 ppm by the pretreatment;

the phospholipid content of a rape seed oil obtained from Lurgi (probably arbitrary mix of crude oil and totally refined oil) was reduced to 60 ppm by the pre-treatment process;

pretreatment of crude rape seed oil #1710 from AOM reduced the P-content from 459 to 200–250 ppm;

with crude soybean oil #1145 from ACM pre-treatment reduced the P-level from 593 to 10 ppm. This soybean oil constitutes an example of oils that can be degummed by water-degumming/citrate treatment alone. Enzyme addition to this crude soybean oil after pre-treatment did not reduce the P-content further.

These data show that the phospholipid composition (hydratable vs. non-hydratable phospholipid) of crude rape seed oil varies greatly from one batch to another, and consequently the level of remaining phospholipid in water-degummed rape seed oil will vary over a wide range (30 ppm (Scanola) to 200–250 ppm (AOM)).

For enzymatic degumming, optimal enzyme dosage is dependent on the amount of non-hydratable phospholipid present after degumming or pre-treatment.

Further, as higher the amount of non-hydratable phospholipid present the oil is, the more useful is the enzymatic degumming method.

This is too illustrated in example 16 below, where the present invention show enzymatic degumming of the crude rape seed oil #1146, having a non-hydratable phospholipids level of around 140 ppm.

Example 16

Degumming of crude rape seed edible oil (I)

Experiments A and B were carried out according to the "General procedure for carrying out enzymatic degumming" as described in example 10 above.

Oil:

Crude rape seed oil from Århus Oliefabrik (AOM), Denmark. Batch C00745/B01146, P-content 609 ppm. This batch contains solid residues.

Enzyme:

Lecitase™ 10L

Batch L646-F02 (10190 U/ml), estimated conc. 20 mg/ml

PL from *Fusarium oxysporum* having the amino acid sequence shown in SEQ NO 2.

Batch F-9700123, $OD_{280}$ 1.48, purity ca. 58%, estimated conc. 0.9 mg/ml.

The enzyme was recombinantly expressed and purified as described above.

Experiment A (reference)

0.6 1 (580 g) of crude rape seed oil is loaded in the equipment and heated to 60° C. At t=30 min, 1.43 ml (5.7 mmoles) of 4 M NaOH solution are added, which yield a pH of about 5.6. At t=35 min., 30 µl (300 Unit) of Lecitase 10L (obtained from Novo Nordisk A/S) are added. The measured phosphorus content in the oil phase after centrifuging as well as the pH values in the aqueous phase is shown in Table 14.

TABLE 14

Results from degumming af crude rape seed oil with Lecitase ™.

| Time (hours) | Phosphorus content in oil phase | pH |
| --- | --- | --- |
| 0 | 609 | |
| 0.50 | 155 | 4.8 |
| 0.58 | 146 | 5.6 |
| 1.0 | 127 | 5.6 |
| 2.0 | 88 | 5.7 |
| 3.5 | 61 | 5.7 |
| 5.0 | 44 | 5.6 |
| 6.0 | 34 | 5.8 |

Experiment B 0.6 1 (581 g) of crude rape seed oil is loaded in the equipment and heated to 40° C. At t=30 min. 1.07 ml (4.3 mmoles) of 4 M NaOH solution were added, which yield a pH of about 5.4. At t=35 min., 1 ml (0.9 mg) of a purified solution (example 2) of phospholipase from *F. oxysporum* is added. The measured phosphorus content in the oil phase after centrifugation as well as the pH values in the aqueous phase is shown in Table 15.

TABLE 15

Results from degumming of crude rape seed oil with phospholipase from *F. oxysporum*.

| Time (hours) | Phosphorus content in oil phase | pH |
| --- | --- | --- |
| 0 | 609 | |
| 0.50 | 155 | 4.9 |
| 0.58 | 149 | 5.4 |
| 1.0 | 91 | 5.3 |
| 2.0 | 13 | 5.4 |
| 3.5 | 11 | 5.3 |
| 5.0 | 13 | 5.4 |
| 6.0 | 10 | 5.2 |

Example 17

Degumming of crude rape seed edible oil (II)

Experiments A and B were carried out according to the "General procedure for carrying out enzymatic degumming" as described in example 10 above.

Oil:

Crude rape seed oil from Århus Oliefabrik (AOM), Denmark. Batch C00745/B01710, P-content 459 ppm.

Enzyme:

Lecitase™ 10L

Batch L646-F02 (10190 U/ml), estimated conc. 20 mg/ml

PL from *Fusarium oxysporum* having the amino acid sequence shown in SEQ NO 2.

Batch F-9700476, $OD_{280}$ 0.8, purity ca. 58%, estimated conc. 0.45 mg/ml.

The enzyme was recombinantly expressed and purified as described above.

Experiment A 0.6 1 (580 g) of crude rape seed oil is loaded in the equipment and heated at 60° C. At t=30 min. 1.43 ml (5.7 mmoles) of 4 M NaOH solution are added, which yield a pH of about 5.6. At t=35 min. an appropriate amount (e.g. 50 µl (around 500 Unit) for 1 mg enzyme/kg oil) of Lecitase 10L (obtained from Novo Nordisk A/S) is added. The measured phosphorus content in the oil phase after centrifuging is shown in Table 16.

TABLE 16

Results from degumming of crude rape seed oil with Lecitase.

| Time (hours) | 1 mg Lecitase/ kg oil P (ppm) | 2 mg Lecitase/ kg oil P (ppm) | 3 mg Lecitase/ kg oil P (ppm) |
|---|---|---|---|
| 0 | 459 | 459 | 459 |
| 0.50 | 251 | 235 | 248 |
| 0.58 | 202 | 194 | 202 |
| 1.0 | 181 | 186 | 183 |
| 2.0 | 165 | 156 | 107 |
| 3.5 | 111 | 66 | 11 |
| 5.0 | 52 | 12 | 12 |
| 6.0 | 20 | 5 | 9 |

Experiment B 0.6 1 (581 g) of crude rape seed oil is loaded in the equipment and heated to 40° C. At t=30 min, 1.07 ml (4.3 mmoles) of 4 M NaOH solution are added, which yield a pH of about 5.0. At t=35 min, an appropriate amount (i.e. 1.6 mg enzyme/kg oil, and 3.2 mg enzyme/kg oil) of a purified solution of phospholipase from *F. oxysporum* is added. The measured phosphorus content in the oil phase after centrifugation is given in Table 17.

TABLE 17

Results from degumming of crude rape seed oil with phospholipase from *F. oxysporum*.

| Time (hours) | 1.6 mg Fusarium/ kg oil P (ppm) | 3.2 mg Fusarium/ kg oil P (ppm) |
|---|---|---|
| 0 | 459 | 459 |
| 0.50 | 236 | 208 |
| 0.58 | 193 | 173 |
| 1.0 | 109 | 96 |
| 2.0 | 9 | 7 |
| 3.5 | 9 | 8 |
| 5.0 | 9 | 9 |
| 6.0 | 9 | 9 |

Lecitase, 60° C., pH 5.5

The enzyme dosage was varied from 1.0 to 3.0 mg/kg oil. The results are given in Table 16 above. At an enzyme dosage of 1.0 mg/kg oil degumming was slow and gave about 20 ppm at 6 hours. With the high enzyme dosages degumming performance was improved to give 10 ppm phosphorus content at about 3.5 hours with 3.0 mg enzyme/kg oil.

It is assumed that performance will improve further if higher enzyme dosages are employed.

*F. oxysporum* PL, 45° C., pH 5.0

Enzyme dosages 1.6 and 3.2 mg/kg oil were tested, and the performance was found to be equally good (Table 17 above). With 1.6 mg enzyme/kg oil—or possibly lower—excellent degumming was observed giving 9 ppm P at about 2 hours. It is foreseen that it is possible to use even lower amounts of the *F. oxysporum* phospholipase (e.g. 0.9 mg/kg oil) and still have good degumming performance.

Example 18

Degumming of water degummed edible oil using an phospholipase preparation obtained from *Fusarium culmorum*

An experiment was carried out according to the "General procedure for carrying out enzymatic degumming" as described in example 10 above.

Oil:

Water-degummed rape seed oil from Århus Oliefabrik (AOM), Denmark.

Batch C00730/B01700, P-content 231 ppm.

Enzyme:

A fermentation broth from *Fusarium culmorum*.

A *Fusarium culmorum* strain was cultivated, centrifuged, and the supernatant was purified as described below.

Seed cultures of the strain *Fusarium culmorum* CBS 513.94 (deposit date Oct. 25, 1994) were produced in 500 ml shakeflasks containing 100 ml of the following composition:

| | |
|---|---|
| Corn steep liquer (dried) | 12 g/l |
| Glucose | 24 g/l |

To each flask 0.5 g $CaCO_3$ and 0.5 ml of oil are added.

pH is adjusted to 5.5 before autoclavation.

After 3 days at 26° C. and 250 rpm, 5 ml of each of the seed cultures were inoculated in shakeflasks containing 100ml of the following medium:

| | |
|---|---|
| Peptone, Difco 0118 | 6 g/l |
| Pepticase, Sheffield Products | 4 g/l |
| Yeast extract, Difco 0127 | 3 g/l |
| Meat extract, Difco 0126 | 1.5 g/l |
| Dextrose, Roquette 101-0441 | 1 g/l |
| Olive oil, Sigma | 10 g/l | pH is adjusted to 7.3–7.4 before autoclavation.

Cultivation took place for 9 days at 26° C. and 250 rpm. The broths were centrifuged and filtrated (0.45 μm) the supernatants collected, and applied for the degumming experiment shown below.

Estimated activity 200 PHLU/ml.

Experiment: Enzymatic degumming of a water degummed oil using a phospholipase preparation obtained from *Fusarium culmorum*

0.6 1 (581 g) of crude rape seed oil is loaded in the equipment and heated to 40° C. At t=30 min, 1.43 ml (5.7 mmoles) of 4 M NaOH solution are added, which yield a pH of about 5.5. At t=35 min., an appropriate amount (i.e. 1070 PHLU/kg oil) of a purified solution of phospholipase from *F. culmorum* is added. The measured phosphorus content in the oil phase after centrifugation is shown in Table 18.

TABLE 18

Results from degumming of crude rape seed oil with phospoilpase from *F. culmorum*.

| Time (hours) | 1070 U F. culmorum/ kg oil P (ppm) |
|---|---|
| 0 | 254 |
| 0.50 | — |
| 0.58 | 213 |
| 1.0 | 137 |
| 2.0 | 61 |
| 3.5 | 9 |
| 5.0 | 8 |
| 6.0 | 7 |

Example 19
Enzymatic degumming of crude oil using Degomma VOD
Oil
Crude rape seed oil C00745/B01700, P-content 459 ppm
Enzyme
A commercial available phospholipase Degomma VOD (R öhm; Germany), est. conc. 10 mg/ml.
0.6 1 (581 g) of crude rape seed oil is loaded in the equipment and heated to 50° C. At t=30 min, 0.714 ml (2.86 mmoles) of 4 M NaOH solution is added, which yields a pH of about 4.5. At t=35 min, an appropriate amount (i.e. 3.6 mg/kg oil, or 7.1 mg/kg oil) of a purified solution of Degomma VOD phospholipase is added. The measured phosphorus content in the oil phase after centrifugation is shown in Table 19.

TABLE 19

| Time | 3.6 mg/kg oil | 7.1 mg/kg oil |
|---|---|---|
| 0 | 276 | 273 |
| 0.50 | 216 | 253 |
| 0.58 | 210 | 246 |
| 1.0 | 127 | 94 |
| 2.0 | 45 | 16 |
| 3.5 | 15 | 7 |
| 5.0 | 15 | 10 |
| 6.0 | 14 | 10 |

This example illustrates that Degomma VOD is able to degum an edible oil. However, in order to obtain a satisfactory degumming of said oil, relatively high doses of Degomma VOD are required as compared to the Fusarium phospholipase of the invention. See e.g. examples 16 and 17 for a comparison.

Example 20
Use of a phospholipase obtained from *F. oxysporum* as a bread improving agent.
Materials and methods
Preparation of bread
European straight dough white bread and rolls were prepared from the following basic recipe:

| BASIC RECIPE | |
|---|---|
| Flour (Meneba BBZ) | 100% (2000 g) |
| Water | 61% |
| Yeast | 4% |
| Salt | 1.5% |
| Sugar | 1.5% |
| Ascorbic acid | 40 ppm |

BAKING PROCEDURE

| Mixing (spiral mixer), 625 RPM | | 3 min |
|---|---|---|
| Mixing (spiral mixer), 1250 RPM | | 3.5 min |
| Evaluation of dough | | 7 min |
| Fermentation (room temperature) | | 15 min |
| Sheeting/moulding | | 3 min |
| Relaxation at room temperature | | 5 min |
| Folding | | 2 min |
| Relaxation at room temperature | | 5 min |
| Sheeting/moulding/panning | | 2 min |
| Proofing (32° C., 82% RH) | Rolls: | 45 min |
| | Panned bread: | 55 min |
| Baking (230° C.) | Rolls: | 22 min |
| | Panned bread: | 35 min |

Evaluation of dough and baked products
Properties of the dough and baked products were determined as follows:
Specific volume index: the volume of a loaf or roll is measured by means the traditional rape seed displacement method. The specific volume is calculated as volume ml per g bread. The specific volume of the control (without enzyme) is defined as 100. The relative specific volume index is calculated as:

$$\text{Specific vol. index} = \frac{\text{specific volume of loaf}}{\text{specific volume of control loaf}} * 100$$

The dough stickiness is evaluated manually according to the following scale:

TABLE 20

| Enzyme/additive | | | | | | | | |
|---|---|---|---|---|---|---|---|---|
| Lecimulthin 100* (g/kg flour) | | | | | 1 | 1 | 1 | 1 |
| F.o. Phospholipase (LU/kg flour) | | 500 | 1500 | 3000 | | 500 | 1500 | 3000 |
| Specific volume index (rolls) | 100 | 110 | 106 | 93 | 99 | 111 | 116 | 108 |
| Specific volume index (panned bread) | 100 | 106 | 99 | 94 | 102 | 107 | 109 | 103 |
| Roll standing (score) | 3 | 4 | 4 | 3 | 3 | 4 | 5 | 4.5 |

*Commercial lecithin preparation for baking (Superfos, Denmark).

RESULTS
Roll standing
very flat 1
flat 2
normal 3
good/round 4
very good 5
too round 6

The results show a clear volume increasing effect of the *Fusarium oxysporum* phospholipase on both rolls and panned bread, in the recipe not containing lecithin. If lecithin is included in the recipe, even better volume effects are obtained, although the lecithin does not contribute to volume itself. A statistical analysis (ANOVA, $\alpha=0.05$), performed in Statgraphics Plus, release 3.0, shows a significant positive synergy between the phospholipase and the lecithin.

Both with and without lecithin in the recipe, a significantly improved shape of rolls (roll standing) is obtained with the *F. oxysporum* phospholipase. In this example, the best roll standing was obtained by combining lecithin and phospholipase (1500 LU/kg flour).

Example 21
Use of a phospholipase obtained from *F. oxysporum* as an anti-staling agent in bread
Materials and methods
Preparation of bread
European straight dough white bread and rolls were prepared from the following basic recipe:

| BASIC RECIPE | |
|---|---|
| Flour (Meneba BBZ) | 100% (2000 g) |
| Water | 61% |
| Yeast | 5% |
| Salt | 1.5% |
| Sugar | 1.5% |

-continued

| | |
|---|---|
| Ascorbic acid | 40 ppm |
| BAKING PROCEDURE | |
| Mixing (spiral mixer), 625 RPM | 3 min |
| Mixing (spiral mixer), 1250 RPM | 3.5 min |
| Evaluation of dough | 7 min |
| Fermentation (room temperature) | 15 min |
| Sheeting/moulding | 3 min |
| Relaxation at room temperature | 5 min |
| Folding | 2 min |
| Relaxation at room temperature | 5 min |
| Sheeting/moulding/panning | 2 min |
| Proofing (32° C., 82% RH) | 55 min |
| Baking (230° C.) | 35 min |

In this example, the loaves were panned in lidded pans, in order to avoid differences in the specific volumes before texture analysis. After cooling, the loaves were stored at room temperature, packed in plastic bags.

Evaluation of baked products

Evaluation of staleness and texture may be performed according to AACC method 74-09. Evaluation of softness of bread crumb as indicators of bread staling were conducted 0, 1, 3, and 7 days after baking, according to the following procedure:

A slice of bread was compressed at constant speed in a texture analyzer (TA TX-2), and the force for compression was measured in g. The firmness of the crumb is measured as the force at 25% compression. The firmness of a bread crumb increases as the bread becomes stale.

RESULTS. The results of firmness measurements as a function of storage days are shown in table 2. Lecimulthin was added in a concentration of 1 g/kg flour, and the *Fusarium oxysporum* phospholipase was added in a dosage of 500 U/kg flour. Every figure in the table is the mean value of 6 measurements (2 loaves, 3 measurements on each).

TABLE 21

| Enzyme/additive | Firmness Day 0 | Firmness Day 1 | Firmness Day 3 | Firmness Day 7 |
|---|---|---|---|---|
| Control | 223 | 350 | 631 | 1061 |
| Lecimulthin 100* | 225 | 261 | 532 | 1010 |
| Phospholipase | 201 | 303 | 573 | 1257 |
| Lecimulthin 100* + Phospholipase | 169 | 304 | 468 | 834 |

*Commercial lecithin preparation for baking (Superfos, Denmark).

As shown in table 21, the breads treated with phospholipase were slightly softer than the control up to 3 days of storage. In combination with lecithin, a significant anti-staling effect could be obtained through the whole storage (not obtainable with lecithin or phospholipase alone).

We claim:

1. An isolated nucleic acid comprising a sequence selected from the group consisting of:
   (a) the phospholipase A-encoding sequence cloned into plasmid pYES 2.0 present in *Escherichia coli* DSM 11299;
   (b) nucleotides 23–1063 of SEQ ID NO:1
   (c) nucleotides 113–1063 of SEQ ID NO:1;
   (d) nucleotides 113–931 of SEQ ID NO:1;
   (e) a nucleic acid encoding amino acids 31–346 of SEQ ID NO 2;
   (f) a nucleic acid encoding amino acids 31–303 of SEQ ID NO 2; and
   (g) a nucleic acid which is at least 70% homologous with any of the foregoing nucleic acids, wherein said nucleic acid encodes a polypeptide exhibiting phospholipase A activity.

2. A nucleic acid as defined in claim 1, wherein said nucleic acid encodes a phospholipase A1 polypeptide.

3. A nucleic acid as defined in claim 1, wherein said nucleic acid encodes a phospholipase A2 polypeptide.

4. A vector comprising an isolated nucleic acid as defined in claim 1.

5. A host cell comprising a vector as defined in claim 4.

6. A host cell as defined in claim 5, wherein said cell is a eukaryotic cell.

7. A host cell as defined in claim 6, wherein said cell is a filamentous fungal cell.

8. A host cell as defined in claim 7, wherein said filamentous fungus is Aspergillus or Fusarium.

9. A method for producing a phospholipase A, which comprises (a) cultivating a host cell as defined in claim 5, under conditions appropriate for expression of said phospholipase and (b) recovering said phospholipase.

10. A phospholipase A produced by a method as defined in claim 9.

* * * * *

SEQUENCE LISTING (1) GENERAL INFORMATION:

(iii) NUMBER OF SEQUENCES: 3

(2) INFORMATION FOR SEQ ID NO:1:

(i) SEQUENCE CHARACTERISTICS:
        (A) LENGTH: 1170 base pairs
        (B) TYPE: nucleic acid
        (C) STRANDEDNESS: single
        (D) TOPOLOGY: linear (ii) MOLECULE TYPE: cDNA (xi) SEQUENCE DESCRIPTION: SEQ ID NO:1:

```
TTGGAGAATA TTCCTTGTCA CGATGCTTCT TCTACCACTC CTCTCGGCCA TCACCCTCGC      60

GGTAGCCAGT CCTGTAGCTC TCGACGACTA CGTCAACTCT CTTGAGGAGC GAGCTGTTGG     120

TGTCACTACA ACCGACTTCA GCAACTTCAA GTTCTACATC CAACACGGCG CCGCAGCTTA     180

CTGCAACTCT GAAGCCGCAG CTGGTTCCAA GATCACCTGC TCCAACAATG GCTGTCCAAC     240

CGTTCAGGGC AACGGAGCGA CCATCGTGAC ATCTTTCGTT GGCTCCAAGA CAGGTATCGG     300

TGGCTACGTC GCGACAGACT CTGCCCGAAA GGAAATCGTC GTCTCGTTCC GCGGAAGCAT     360

CAATATTCGA AACTGGCTTA CCAACCTCGA CTTCGGCCAG GAAGACTGCA GTCTCGTCTC     420

TGGATGCGGT GTGCACTCTG GCTTCCAGCG AGCCTGGAAT GAGATCTCGT CTCAAGCAAC     480

CGCTGCTGTT GCCTCCGCCC GCAAGGCGAA CCCTTCTTTC AACGTCATTT CTACAGGCCA     540

CTCCCTTGGA GGTGCCGTGG CCGTTCTTGC TGCCGCAAAC TTGAGAGTCG GTGGAACACC     600

CGTCGATATT TACACCTACG GCTCTCCCCG TGTCGGAAAC GCGCAGCTCT CAGCCTTCGT     660

CTCAAACCAG GCTGGTGGAG AGTACCGCGT TACACACGCT GATGACCCTG TCCCCCGTCT     720
```

```
CCCTCCTCTG ATCTTCGGAT ACAGGCACAC AACTCCTGAG TTCTGGCTGT CCGGCGGTGG        780

AGGCGACAAG GTTGACTACA CCATCAGCGA TGTCAAGGTC TGTGAGGGTG CTGCCAACCT        840

TGGATGCAAC GGTGGAACTC TTGGTTTGGA TATTGCTGCT CATCTGCATT ACTTCCAGGC        900

GACTGACGCC TGTAACGCTG GTGGCTTCTC TTGGCGACGA TACAGAAGCG CCGAGAGCGT        960

CGACAAGAGG GCCACCATGA CTGATGCCGA GCTTGAGAAA AAGCTGAACT CTTATGTCCA       1020

GATGGATAAG GAGTATGTGA AGAATAACCA GGCCCGCTCT TAACGAGGGT ATGAGGTTTG       1080

ATGGGAAATG ACATGATTCA TGAACGAAAC CATAGTACAT ATGATGCAAA TAGGATATAA       1140

AAACATATTT CATTCACTAG CTTTACACAA                                        1170
```

(2) INFORMATION FOR SEQ ID NO:2:

(i) SEQUENCE CHARACTERISTICS:
  (A) LENGTH: 346 amino acids
  (B) TYPE: amino acid
  (C) STRANDEDNESS: single
  (D) TOPOLOGY: linear (ii) MOLECULE TYPE: protein (xi) SEQUENCE DESCRIPTION: SEQ ID NO:2:

```
Met Leu Leu Pro Leu Leu Ser Ala Ile Thr Leu Ala Val Ala Ser
 1               5                  10                  15

Pro Val Ala Leu Asp Asp Tyr Val Asn Ser Leu Glu Glu Arg Ala Val
                20                  25                  30

Gly Val Thr Thr Thr Asp Phe Ser Asn Phe Lys Phe Tyr Ile Gln His
             35                  40                  45

Gly Ala Ala Ala Tyr Cys Asn Ser Glu Ala Ala Ala Gly Ser Lys Ile
         50                  55                  60

Thr Cys Ser Asn Asn Gly Cys Pro Thr Val Gln Gly Asn Gly Ala Thr
 65                  70                  75                  80

Ile Val Thr Ser Phe Val Gly Ser Lys Thr Gly Ile Gly Gly Tyr Val
                 85                  90                  95

Ala Thr Asp Ser Ala Arg Lys Glu Ile Val Val Ser Phe Arg Gly Ser
            100                 105                 110

Ile Asn Ile Arg Asn Trp Leu Thr Asn Leu Asp Phe Gly Gln Glu Asp
        115                 120                 125

Cys Ser Leu Val Ser Gly Cys Gly Val His Ser Gly Phe Gln Arg Ala
130                 135                 140

Trp Asn Glu Ile Ser Ser Gln Ala Thr Ala Ala Val Ala Ser Ala Arg
145                 150                 155                 160

Lys Ala Asn Pro Ser Phe Asn Val Ile Ser Thr Gly His Ser Leu Gly
                165                 170                 175

Gly Ala Val Ala Val Leu Ala Ala Asn Leu Arg Val Gly Gly Thr
            180                 185                 190

Pro Val Asp Ile Tyr Thr Tyr Gly Ser Pro Arg Val Gly Asn Ala Gln
        195                 200                 205

Leu Ser Ala Phe Val Ser Asn Gln Ala Gly Gly Glu Tyr Arg Val Thr
    210                 215                 220

His Ala Asp Asp Pro Val Pro Arg Leu Pro Pro Leu Ile Phe Gly Tyr
225                 230                 235                 240

Arg His Thr Thr Pro Glu Phe Trp Leu Ser Gly Gly Gly Asp Lys
                245                 250                 255

Val Asp Tyr Thr Ile Ser Asp Val Lys Val Cys Glu Gly Ala Ala Asn
            260                 265                 270
```

```
Leu Gly Cys Asn Gly Gly Thr Leu Gly Leu Asp Ile Ala Ala His Leu
            275                 280                 285

His Tyr Phe Gln Ala Thr Asp Ala Cys Asn Ala Gly Gly Phe Ser Trp
            290                 295                 300

Arg Arg Tyr Arg Ser Ala Glu Ser Val Asp Lys Arg Ala Thr Met Thr
305                 310                 315                 320

Asp Ala Glu Leu Glu Lys Lys Leu Asn Ser Tyr Val Gln Met Asp Lys
            325                 330                 335

Glu Tyr Val Lys Asn Asn Gln Ala Arg Ser
            340                 345

(2) INFORMATION FOR SEQ ID NO:3:

(i) SEQUENCE CHARACTERISTICS:
        (A) LENGTH: 333 amino acids
        (B) TYPE: amino acid
        (C) STRANDEDNESS: single
        (D) TOPOLOGY: linear (ii) MOLECULE TYPE: protein (xi) SEQUENCE DESCRIPTION: SEQ ID NO:3:

Met Met Leu Val Leu Ser Leu Leu Ser Ile Ile Ala Phe Thr Ala Ala
1               5                   10                  15

Gly Pro Val Pro Ser Val Asp Glu Asn Thr Arg Val Leu Glu His Arg
            20                  25                  30

Ala Val Thr Val Thr Thr Gln Asp Leu Ser Asn Phe Arg Phe Tyr Leu
            35                  40                  45

Gln His Ala Asp Ala Ala Tyr Cys Asn Phe Asn Thr Ala Val Gly Lys
        50                  55                  60

Pro Val His Cys Ser Ala Gly Asn Cys Pro Asp Ile Glu Lys Asp Ala
65                  70                  75                  80

Ala Ile Val Val Gly Ser Val Gly Thr Lys Thr Gly Ile Gly Ala
            85                  90                  95

Tyr Val Ala Thr Asp Asn Ala Arg Lys Glu Ile Val Ser Val Arg
            100                 105                 110

Gly Ser Ile Asn Val Arg Asn Trp Ile Thr Asn Phe Asn Phe Gly Gln
        115                 120                 125

Lys Thr Cys Asp Leu Val Ala Gly Cys Gly Val His Thr Gly Phe Leu
        130                 135                 140

Asp Ala Trp Glu Glu Val Ala Ala Asn Val Lys Ala Ala Val Ser Ala
145                 150                 155                 160

Ala Lys Thr Ala Asn Pro Thr Phe Lys Phe Val Thr Gly His Ser
            165                 170                 175

Leu Gly Gly Ala Val Ala Thr Ile Ala Ala Ala Tyr Leu Arg Lys Asp
            180                 185                 190

Gly Phe Pro Phe Asp Leu Tyr Thr Tyr Gly Ser Pro Arg Val Gly Asn
        195                 200                 205

Asp Phe Phe Ala Asn Phe Val Thr Gln Gln Thr Gly Ala Glu Tyr Arg
        210                 215                 220

Val Thr His Gly Asp Asp Pro Val Pro Arg Leu Pro Pro Ile Val Phe
225                 230                 235                 240

Gly Tyr Arg His Thr Ser Pro Glu Tyr Trp Leu Asn Gly Gly Pro Leu
            245                 250                 255

Asp Lys Asp Tyr Thr Val Thr Glu Ile Lys Val Cys Glu Gly Ile Ala
            260                 265                 270
```

-continued

```
Asn Val Met Cys Asn Gly Gly Thr Ile Gly Leu Asp Ile Leu Ala His
        275                 280                 285

Ile Thr Tyr Phe Gln Ser Met Ala Thr Cys Ala Pro Ile Ala Ile Pro
    290                 295                 300

Trp Lys Arg Asp Met Ser Asp Glu Glu Leu Glu Lys Lys Leu Thr Gln
305                 310                 315                 320

Tyr Ser Glu Met Asp Gln Glu Phe Val Lys Gln Met Ile
                325                 330
```